United States Patent
Kunii et al.

(10) Patent No.: US 10,794,719 B2
(45) Date of Patent: *Oct. 6, 2020

(54) VEHICLE IMAGE PROJECTION APPARATUS THAT PROJECTS AN IMAGE IN THE FRONT AND BACK OF A VEHICLE BASED ON SENSOR INFORMATION

(71) Applicant: MAXELL, LTD., Otokuni-gun, Kyoto (JP)

(72) Inventors: Yasuhiko Kunii, Kyoto (JP); Takuya Shimizu, Kyoto (JP); Hiroyuki Nakamura, Kyoto (JP); Nobuyuki Kaku, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/565,431

(22) PCT Filed: Mar. 31, 2016

(86) PCT No.: PCT/JP2016/060614
§ 371 (c)(1),
(2) Date: Oct. 10, 2017

(87) PCT Pub. No.: WO2016/163295
PCT Pub. Date: Oct. 13, 2016

(65) Prior Publication Data
US 2018/0118095 A1    May 3, 2018

(30) Foreign Application Priority Data

Apr. 10, 2015  (JP) ................................ 2015-080724
Aug. 5, 2015   (JP) ................................ 2015-155165

(51) Int. Cl.
*G01C 21/36*    (2006.01)
*B60Q 1/14*     (2006.01)
(Continued)

(52) U.S. Cl.
CPC ............. *G01C 21/365* (2013.01); *B60Q 1/08* (2013.01); *B60Q 1/085* (2013.01); *B60Q 1/14* (2013.01);
(Continued)

(58) Field of Classification Search
CPC .. B60Q 2400/50; B60Q 1/50; B60Q 2400/40; B60Q 1/0023; B60Q 1/22; B60Q 1/24;
(Continued)

(56) References Cited

U.S. PATENT DOCUMENTS 6,969,183 B2 * 11/2005 Okubo .................... B60Q 1/085
                                                        362/466
7,233,311 B2 *  6/2007 Okubo .................... B60Q 1/085
                                                        345/108

(Continued)

FOREIGN PATENT DOCUMENTS

EP    2233356 A1    9/2010
JP    08-043781 A   2/1996
(Continued)

OTHER PUBLICATIONS

International Search Report, PCT/JP2016/060614, dated Jun. 14, 2016, 2 pgs.

(Continued)

*Primary Examiner* — Bao-Luan Q Le
(74) *Attorney, Agent, or Firm* — Mattingly & Malur, PC

(57) ABSTRACT

Information related to a vehicle can be displayed by projecting an image based on the information on a road surface or the like. An image projection apparatus that projects an image includes: a sensor unit that acquires information related to a vehicle; and an image projection unit that projects the image based on the information acquired by the sensor unit.

9 Claims, 21 Drawing Sheets

(51) Int. Cl.
*B60Q 1/08* (2006.01)
*B60Q 1/26* (2006.01)
*F21W 103/60* (2018.01)

(52) U.S. Cl.
CPC ............. *B60Q 1/1423* (2013.01); *B60Q 1/26* (2013.01); *B60Q 2400/50* (2013.01); *F21W 2103/60* (2018.01)

(58) Field of Classification Search
CPC .... B60Q 1/346; B60Q 1/2619; B60Q 1/2661; B60Q 1/2696; B60Q 1/302; B60Q 1/32; B60Q 1/323; B60Q 1/34; B60Q 2900/30; B60Q 1/1423; B60Q 1/085; B60Q 1/08; B60Q 1/14; B60Q 1/26; G03B 29/00; G09F 21/04; G01C 21/365
See application file for complete search history.

(56) References Cited

U.S. PATENT DOCUMENTS

| | | | | |
|---|---|---|---|---|
| 7,287,884 B2* | 10/2007 | Koike | B60Q 1/484 | 315/77 |
| 7,347,595 B2* | 3/2008 | Brun | B60Q 1/0011 | 340/435 |
| 7,782,184 B2* | 8/2010 | Wittorf | B60Q 1/50 | 340/435 |
| 7,791,458 B2* | 9/2010 | Shimaoka | B60Q 1/085 | 340/435 |
| 8,325,027 B2* | 12/2012 | Tee | A42B 3/044 | 340/321 |
| 8,531,285 B2* | 9/2013 | Purks | B60Q 1/38 | 340/435 |
| 9,090,207 B2* | 7/2015 | Meyers | B60Q 1/38 | |
| 9,221,509 B2* | 12/2015 | Lai | B62J 6/001 | |
| 9,315,146 B2* | 4/2016 | Purks | B60Q 1/34 | |
| 9,376,055 B2* | 6/2016 | Sura | B60Q 1/56 | |
| 9,542,824 B2* | 1/2017 | Beggs | B60Q 1/2673 | |
| 9,778,029 B2* | 10/2017 | Yamaguchi | G01C 21/28 | |
| 9,827,901 B1* | 11/2017 | Thompson | B60Q 1/34 | |
| 10,065,557 B2* | 9/2018 | Imaishi | B60Q 1/444 | |
| 10,214,141 B2* | 2/2019 | Yatsu | F21S 41/125 | |
| 2003/0147247 A1* | 8/2003 | Koike | B60Q 1/484 | 362/464 |
| 2004/0189447 A1* | 9/2004 | Okubo | B60Q 1/085 | 340/425.5 |
| 2004/0218401 A1* | 11/2004 | Okubo | B60Q 1/085 | 362/526 |
| 2004/0252516 A1* | 12/2004 | Brun | B60Q 1/0011 | 362/465 |
| 2006/0245199 A1* | 11/2006 | Brun | B60Q 1/0011 | 362/465 |
| 2007/0102214 A1* | 5/2007 | Wittorf | B60Q 1/50 | 180/167 |
| 2008/0084165 A1* | 4/2008 | Otsuka | B60Q 1/0023 | 315/82 |
| 2008/0175012 A1* | 7/2008 | Shimaoka | B60Q 1/085 | 362/464 |
| 2008/0198372 A1* | 8/2008 | Pan | B60Q 1/38 | 356/121 |
| 2010/0283590 A1* | 11/2010 | Tee | A42B 3/044 | 340/432 |
| 2011/0012510 A1 | 1/2011 | Tani et al. | | |
| 2011/0128141 A1* | 6/2011 | Purks | B60Q 1/38 | 340/475 |
| 2011/0292667 A1* | 12/2011 | Meyers | B60Q 1/38 | 362/465 |
| 2012/0044090 A1* | 2/2012 | Kahler | B60Q 1/50 | 340/905 |
| 2013/0335212 A1* | 12/2013 | Purks | B60Q 1/34 | 340/435 |
| 2014/0028980 A1* | 1/2014 | Othmer | B60Q 1/50 | 353/14 |
| 2014/0085470 A1* | 3/2014 | Sako | G03B 21/006 | 348/148 |
| 2014/0203923 A1* | 7/2014 | Lai | B62J 6/001 | 340/432 |
| 2015/0145701 A1* | 5/2015 | Beggs | B60Q 1/2673 | 340/944 |
| 2015/0239390 A1* | 8/2015 | Oliverio | G07C 5/08 | 340/461 |
| 2015/0241015 A1* | 8/2015 | Johnson | G09F 19/18 | 362/509 |
| 2015/0241016 A1* | 8/2015 | Sura | B60Q 1/56 | 362/509 |
| 2016/0090023 A1* | 3/2016 | Asaoka | B60Q 1/085 | 345/697 |
| 2016/0167648 A1* | 6/2016 | James | B60Q 1/503 | 701/28 |
| 2016/0207443 A1* | 7/2016 | Widdowson | B60Q 1/0011 | |
| 2017/0018087 A1* | 1/2017 | Yamaguchi | G01C 21/28 | |
| 2017/0144591 A1* | 5/2017 | Yatsu | F21S 41/125 | |
| 2017/0203685 A1* | 7/2017 | Hirai | B60Q 1/0023 | |
| 2017/0259734 A1* | 9/2017 | Imaishi | B60Q 1/444 | |
| 2017/0267167 A1* | 9/2017 | Sakata | B60Q 1/38 | |

FOREIGN PATENT DOCUMENTS

| | | |
|---|---|---|
| JP | 2004-136838 A | 5/2004 |
| JP | 2004-210130 A | 7/2004 |
| JP | 2004-231178 A | 8/2004 |
| JP | 2008-201407 A | 9/2008 |
| JP | 2009-149152 A | 7/2009 |
| JP | 2010-026759 A | 2/2010 |
| JP | 2010-095048 A | 4/2010 |
| JP | 2011-020559 A | 2/2011 |
| JP | 2012-247369 A | 12/2012 |
| JP | 2014-153868 A | 2/2013 |
| JP | 2014-061786 A | 4/2014 |
| JP | 2014-189198 A | 10/2014 |

OTHER PUBLICATIONS

Chinese Office Action dated Jan. 29, 2019 for the Chinese Patent Application No. 201680018914.8.
Japanese Office Action dated Oct. 1, 2019 for the Japanese Patent Application No. 2019-001640.

* cited by examiner

FIG. 2
(A)
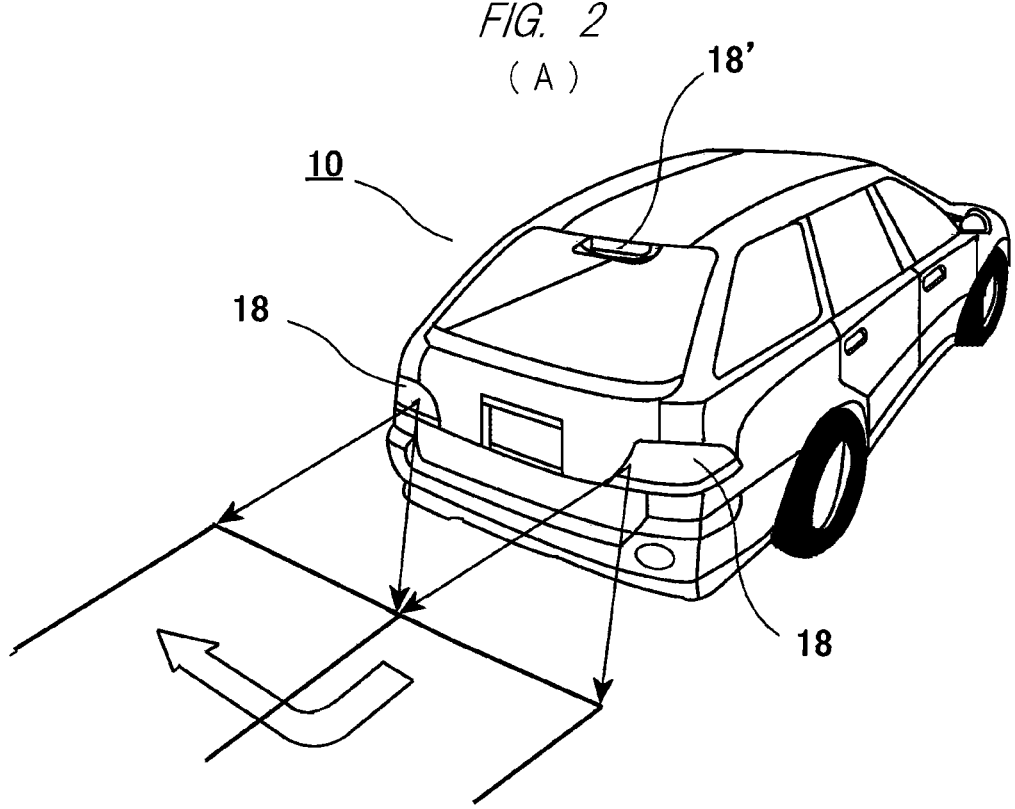
(B)
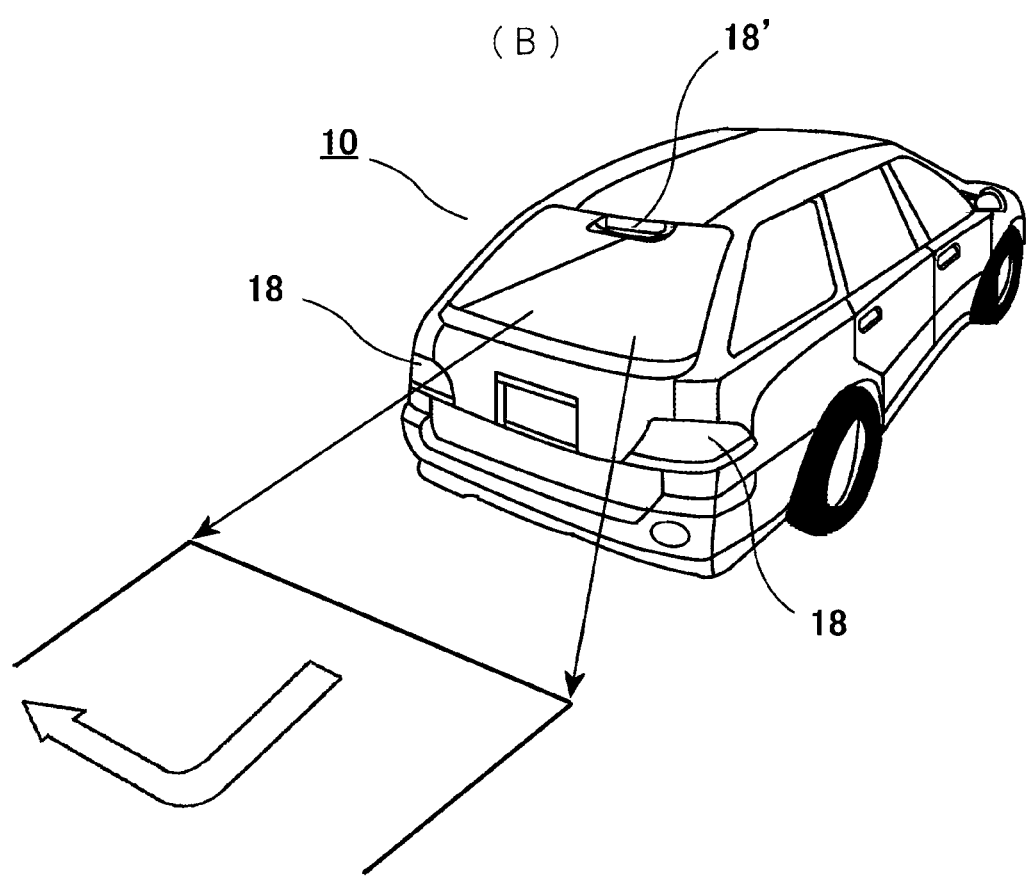

FIG. 9
(A) 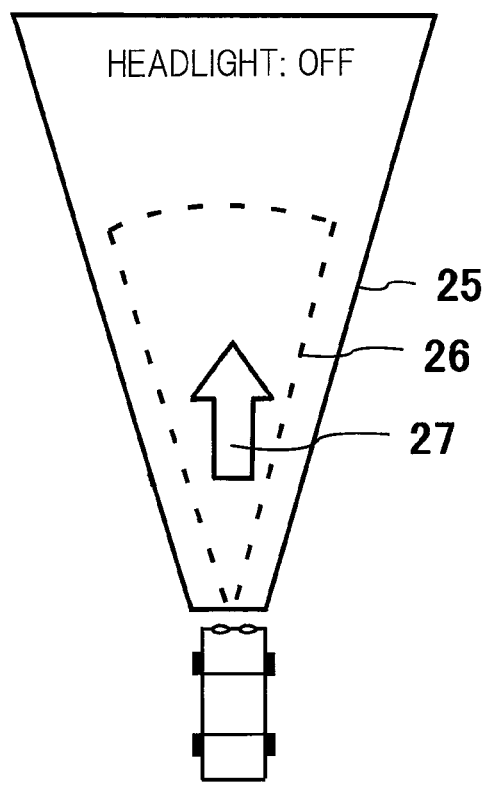
(B) 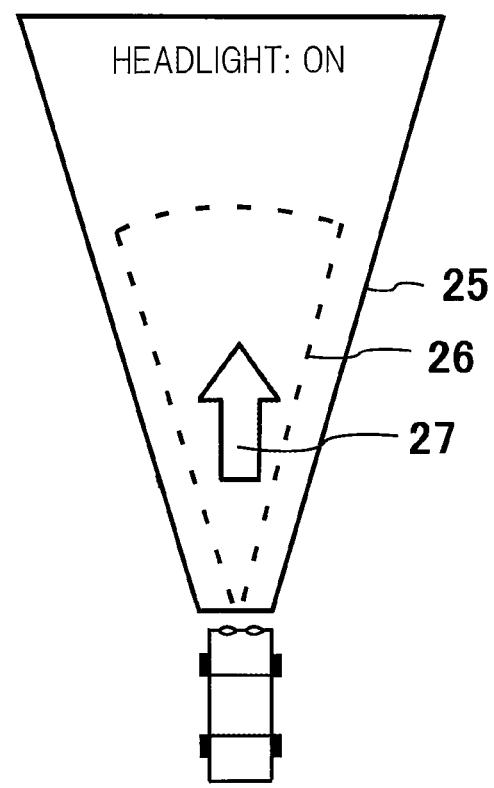

FIG. 13
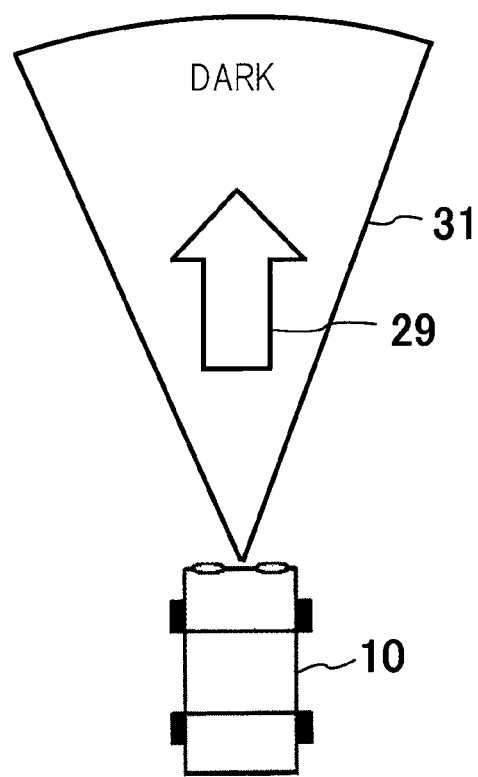
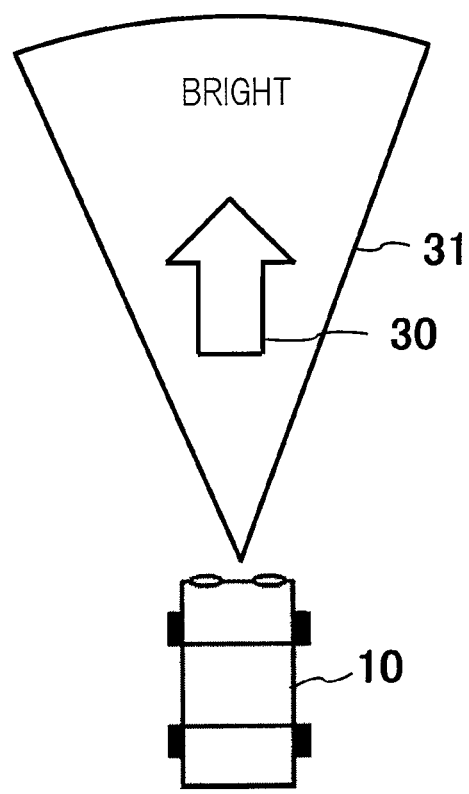

FIG. 19
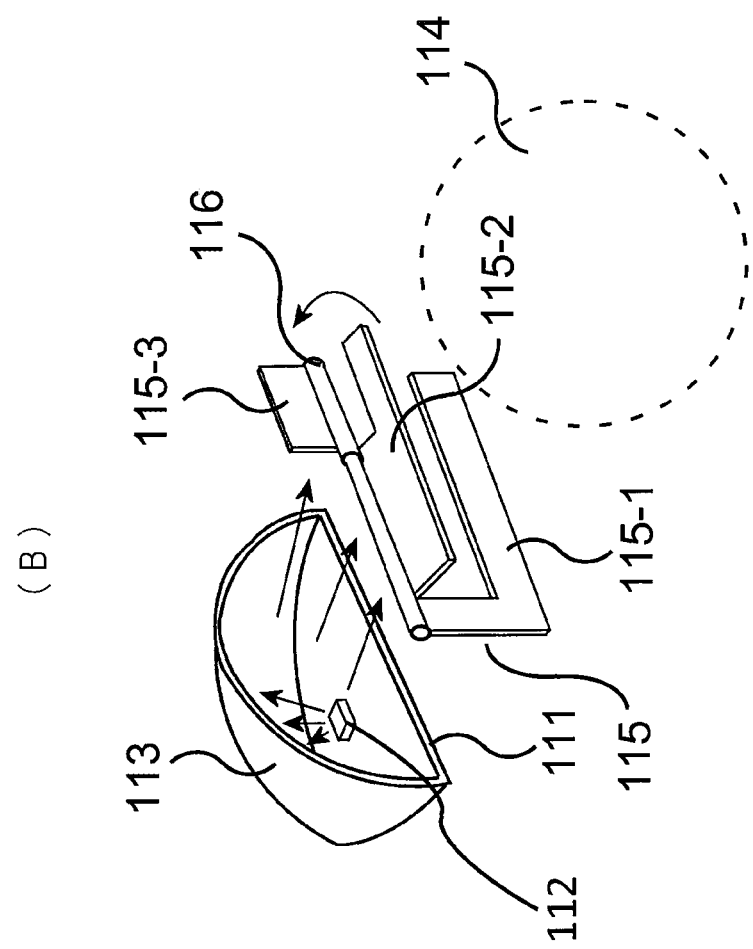
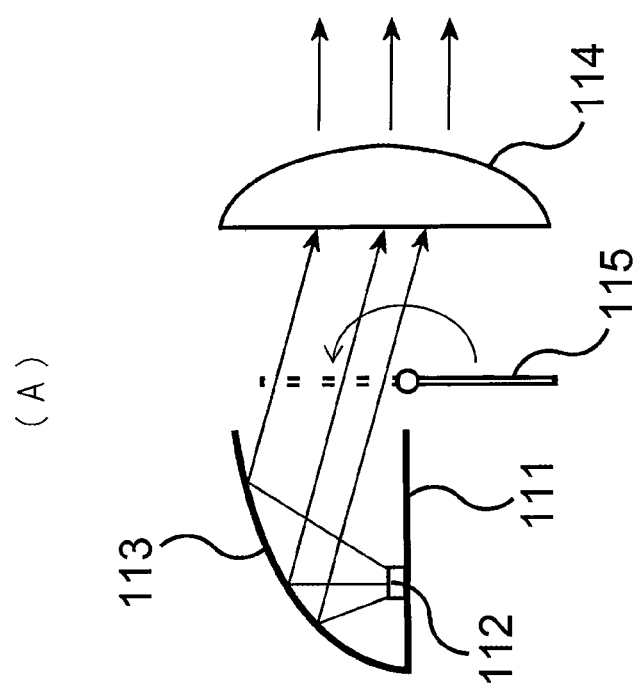

VEHICLE IMAGE PROJECTION APPARATUS THAT PROJECTS AN IMAGE IN THE FRONT AND BACK OF A VEHICLE BASED ON SENSOR INFORMATION

TECHNICAL FIELD

The present invention relates to an image projection apparatus.

BACKGROUND ART

An image projection apparatus typified by a projector has already been used in various fields as an apparatus for projecting a desired image in an enlarged manner, and it has been widely used as a display device for a personal computer and a cellular phone in recent years.

Regarding such an image projection apparatus, those listed below have already been known as prior art techniques particularly related to the use in a vehicle.

RELATED ART DOCUMENTS

Patent Documents

Patent Document 1: Japanese Patent Application Laid-Open Publication No. H08-43781
Patent Document 2: Japanese Patent Application Laid-Open Publication No. 2004-136838
Patent Document 3: Japanese Patent Application Laid-Open Publication No. 2010-26759
Patent Document 4: Japanese Patent Application Laid-Open Publication No. 2012-247369
Patent Document 5: Japanese Patent Application Laid-Open Publication No. 2014-153868

SUMMARY OF THE INVENTION

Problems to be Solved by the Invention

Namely, Patent Document 1 described above discloses a projection type display apparatus which uses a vehicle headlight as an external light source by disposing an LCD projector, which incorporates no light source and is excellent in portability, in front of the vehicle headlight. In Patent Document 2, a first state in which the projector is incorporated in front of the headlight in the vehicle in advance and a second state in which the projector or the headlight is moved to emit light flux from the headlight directly to the outside of the vehicle are realized for solving a problem of Patent Document 1, and further an embodiment in which an image is displayed on a road is disclosed.

Also, an apparatus for vehicle driving support which, in order to effectively arouse attention of a driver of a vehicle at the time of determination of lane departure, displays information for promoting attention on a road ahead of a vehicle by irradiation means (laser) attached to a headlight part in front of the vehicle is known by Patent Document 3. In addition, an apparatus which is provided with a projector as projection means attached at a front part of a vehicle and projects a route guide image for guiding the vehicle in a branching direction based on route information searched by a navigation system on a road surface ahead of the vehicle, with a setting of a projection angle is already known by Patent Document 4. Further, an apparatus for vehicle driving support which enables recognition of a place where a vehicle is heading by projecting a drawing pattern made up of target marks and tracking lines on a road surface ahead of the vehicle based on a traveling state of the vehicle, and thus enables proper driving based thereon is already known by Patent Document 5.

A vehicle runs regardless of day or night, and surroundings of the vehicle are bright in the daytime and the front of the vehicle becomes bright by lighting of a headlight (HL) in the nighttime, so that visibility of an image projected on the road surface ahead of the vehicle may be degraded. In order to secure higher safety also for pedestrians walking near the vehicle, satisfactory visibility is required for the image projected on the road surface. However, the conventional techniques described above have not effectively performed projection such that the projected image can be visually recognized easily when brightness outside the vehicle or the traveling state changes.

Thus, the present invention has been made in view of the problems in the conventional techniques described above, and an object thereof is to provide an image projection apparatus capable of displaying an image so as to be visually recognized easily by projecting the image on a road surface, wall surface, or the vehicle (hereinafter, road surface or the like) based on vehicle information such as the brightness, the traveling state, and the like of the vehicle (mobile body typified by automobile or the like).

Means for Solving the Problems

To solve the problems mentioned above, for example, a configuration described in CLAIMS is adopted. The present application includes a plurality of means to solve the problems and an example thereof is an image projection apparatus that projects an image, and the image projection apparatus includes: a sensor unit that acquires information related to a vehicle; and an image projection unit that projects the image based on the information acquired by the sensor unit.

Effects of the Invention

According to the present invention, it is possible to project and display an easily recognizable image on a road surface or the like based on information related to a vehicle.

BRIEF DESCRIPTIONS OF THE DRAWINGS

FIGS. 1(A) and (B) are front perspective views of a vehicle which mounts an image projection apparatus according to an embodiment of the present invention and projects an image on a road surface or the like;

FIGS. 2(A) and (b) are rear perspective views of a vehicle which mounts the image projection apparatus according to the embodiment of the present invention and projects an image on a road surface or the like;

Figure 7:
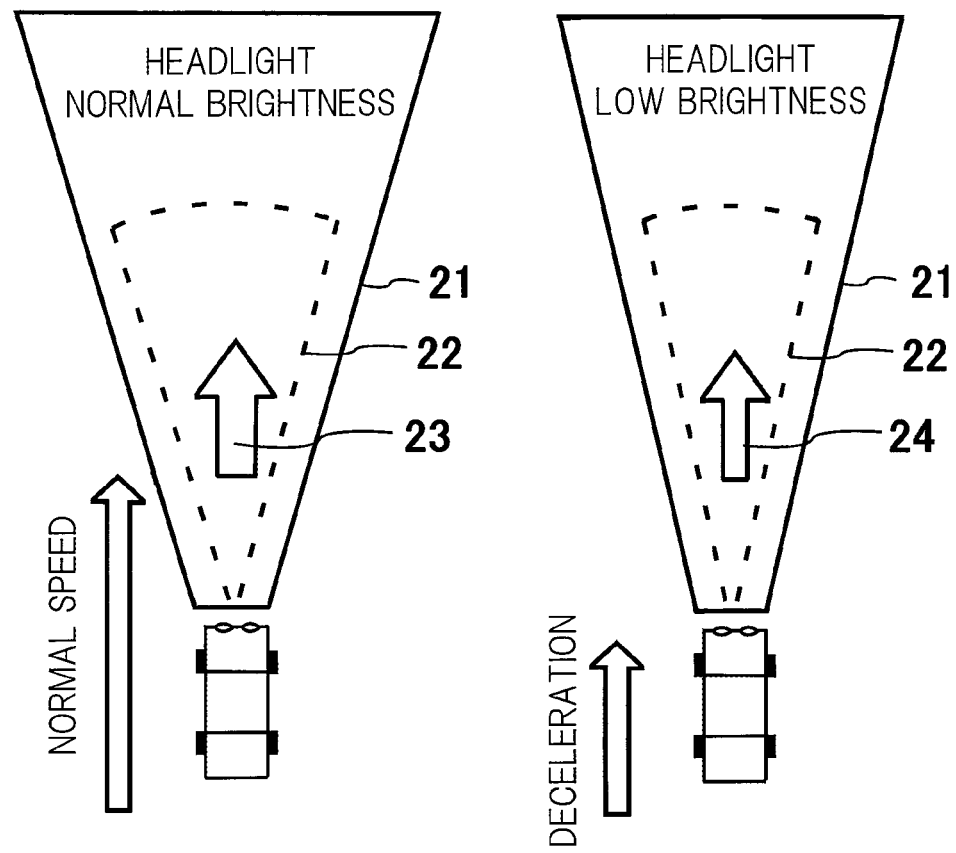
Figure 8:
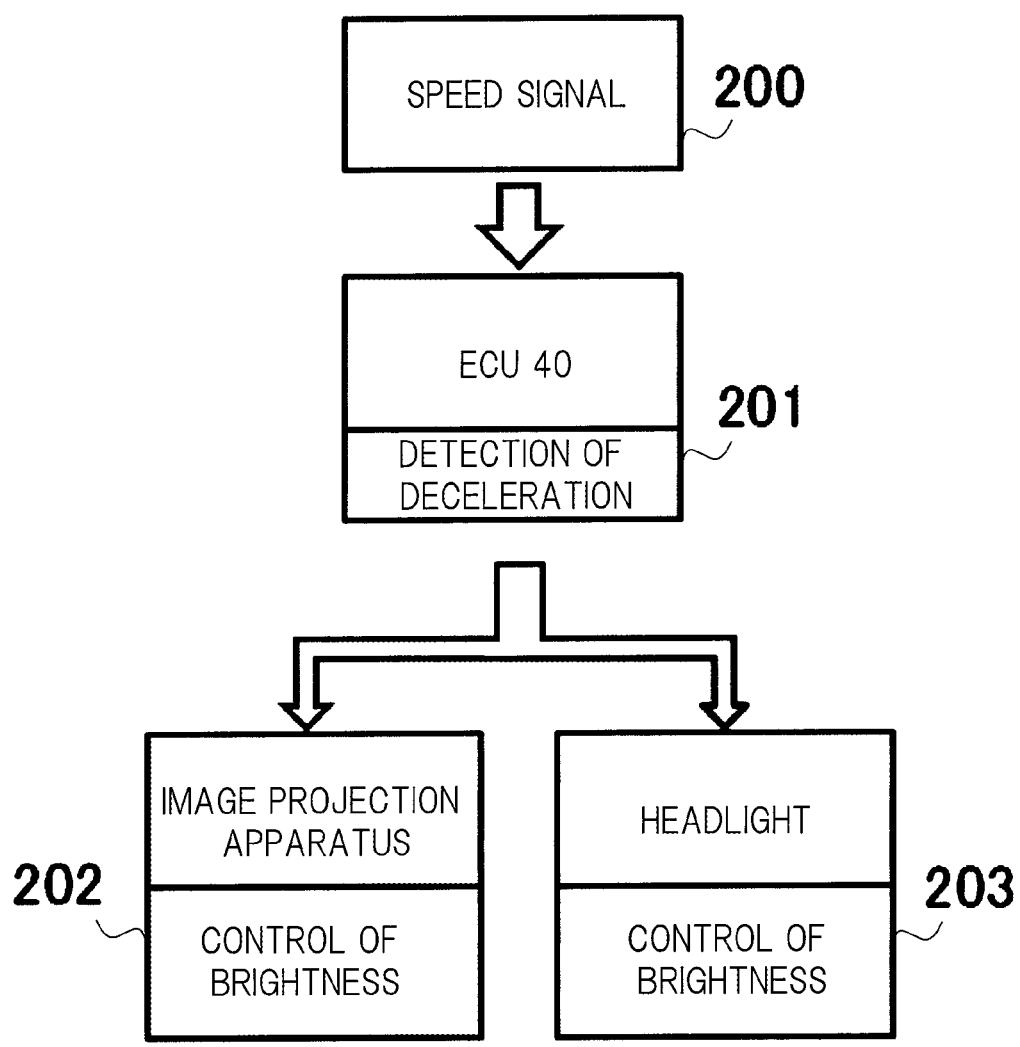
Figure 10:
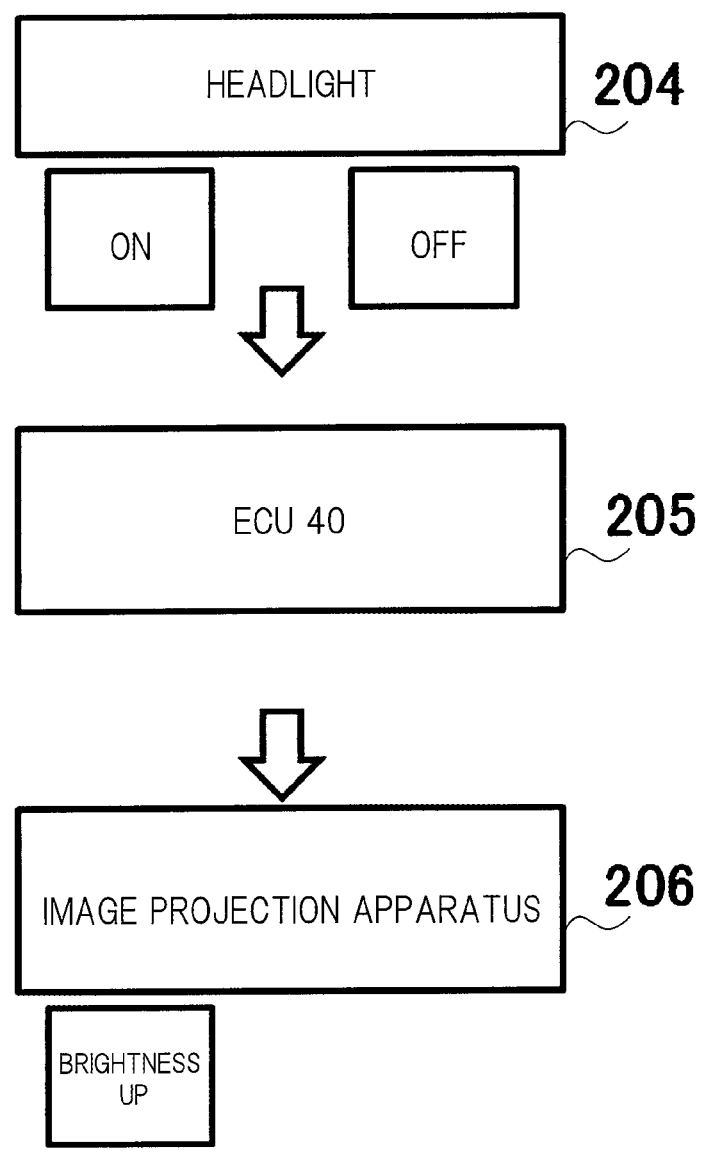
Figure 11:
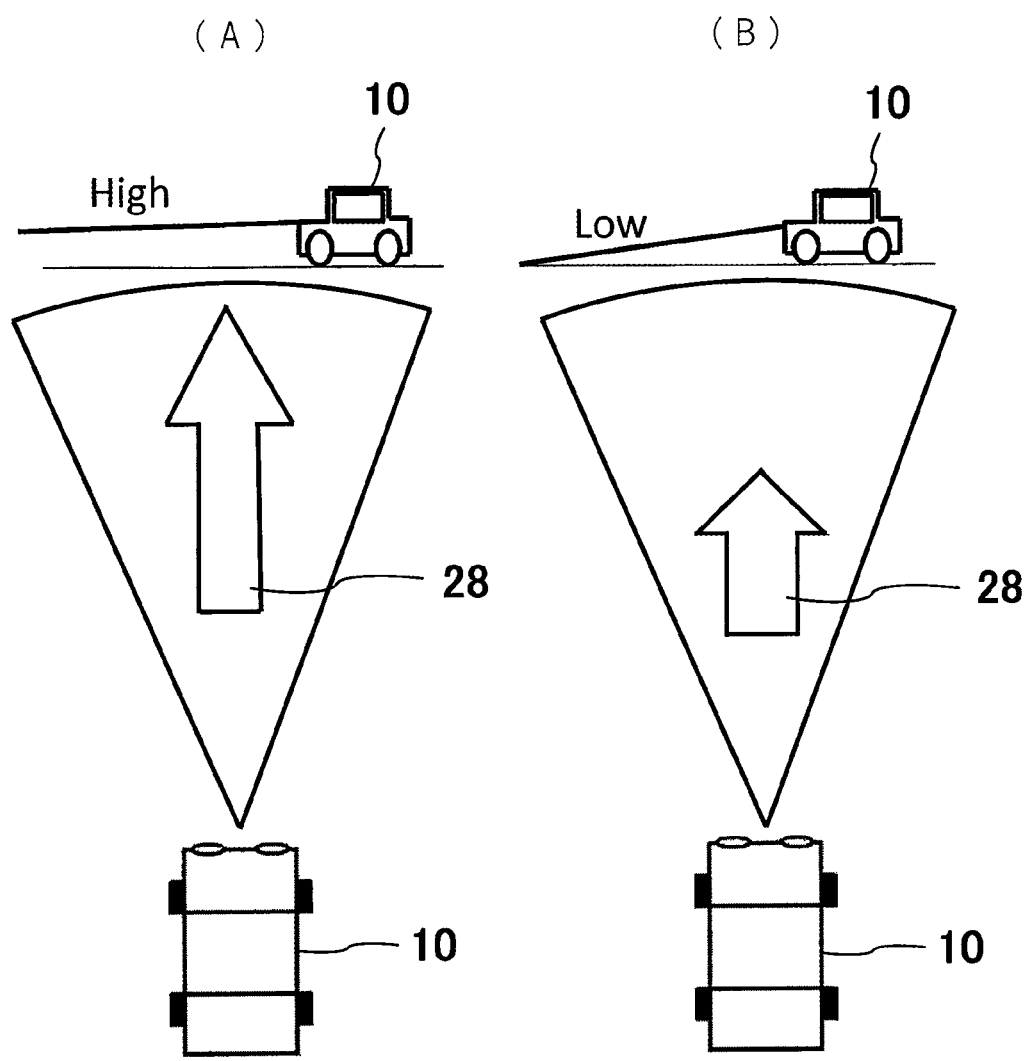
Figure 12:
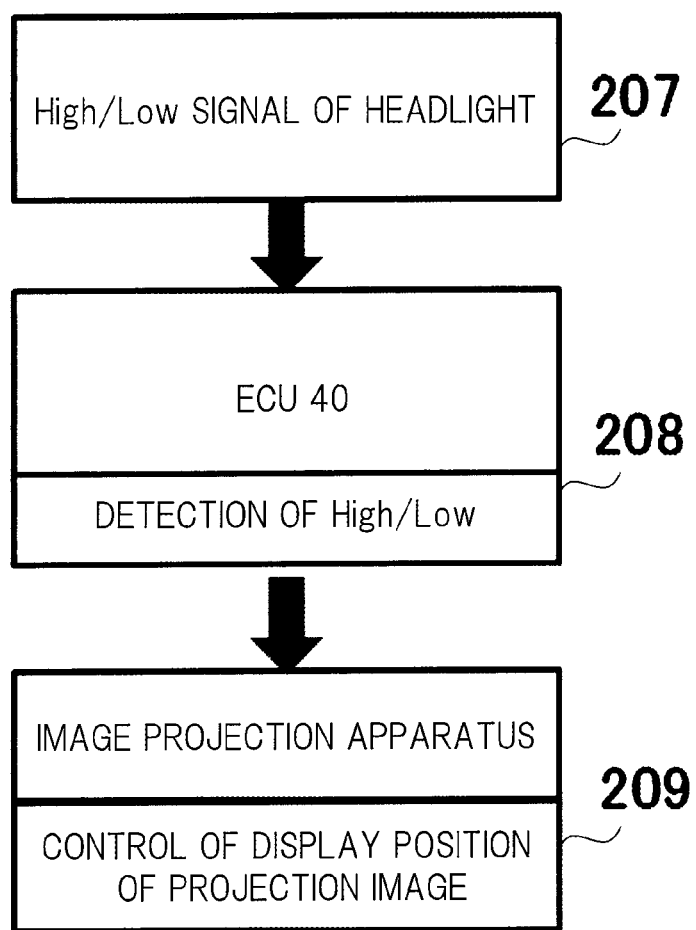
Figure 14:
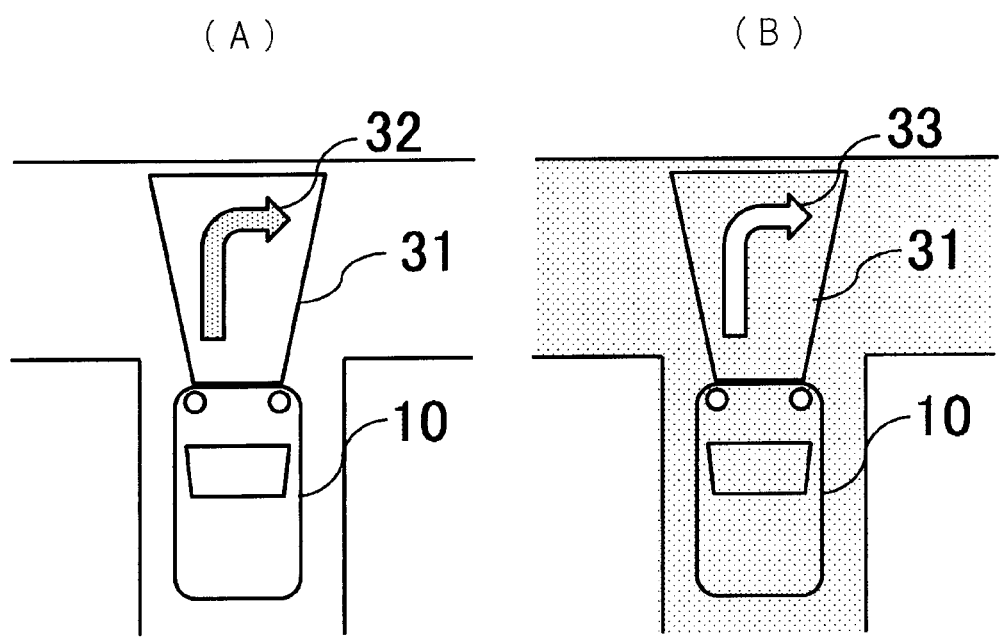
Figure 15:
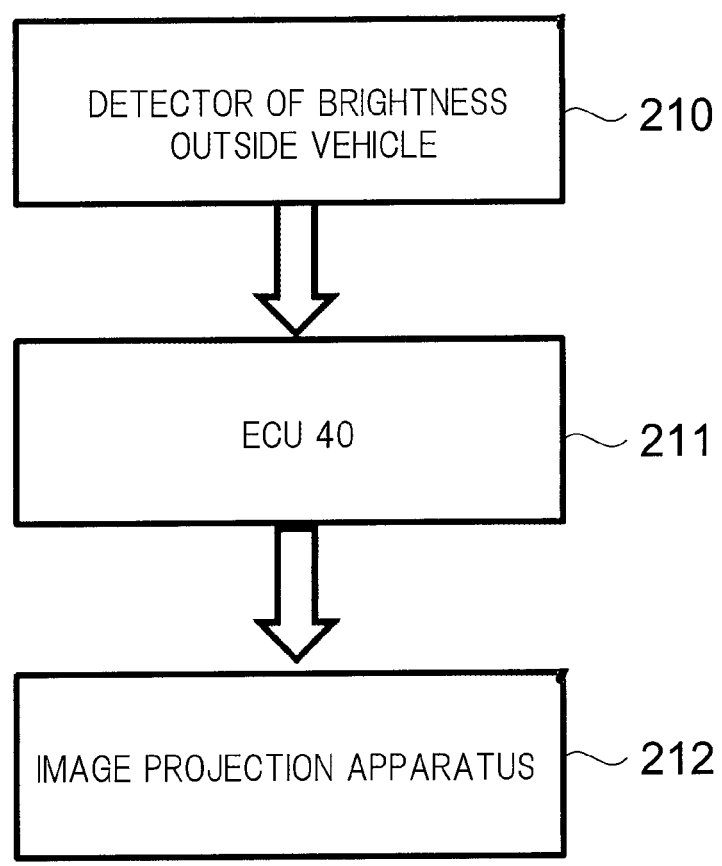
Figure 16:
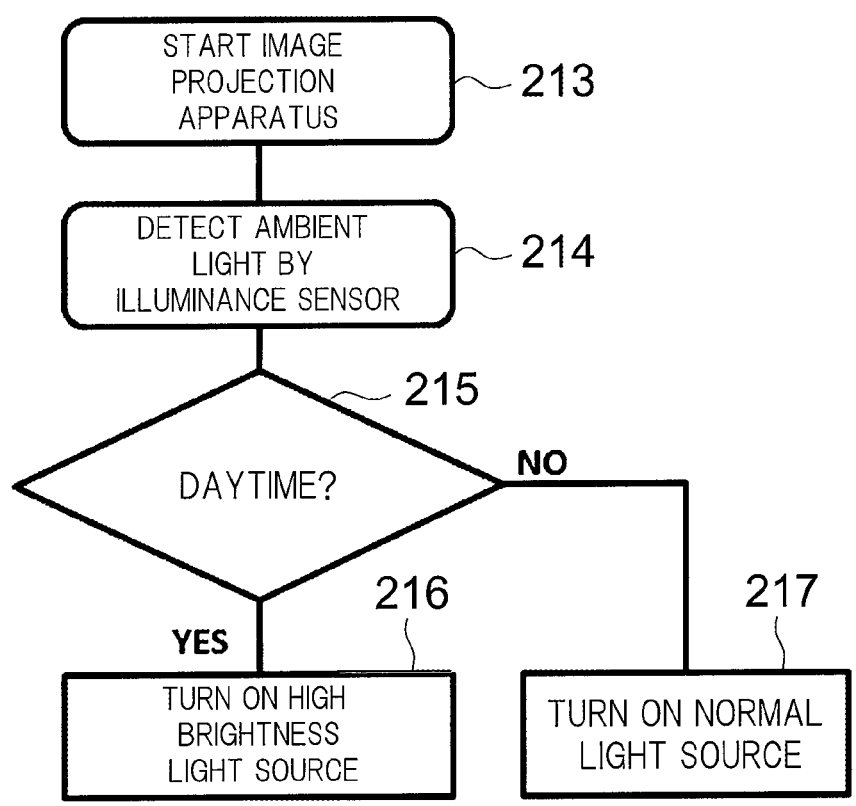
Figure 17:
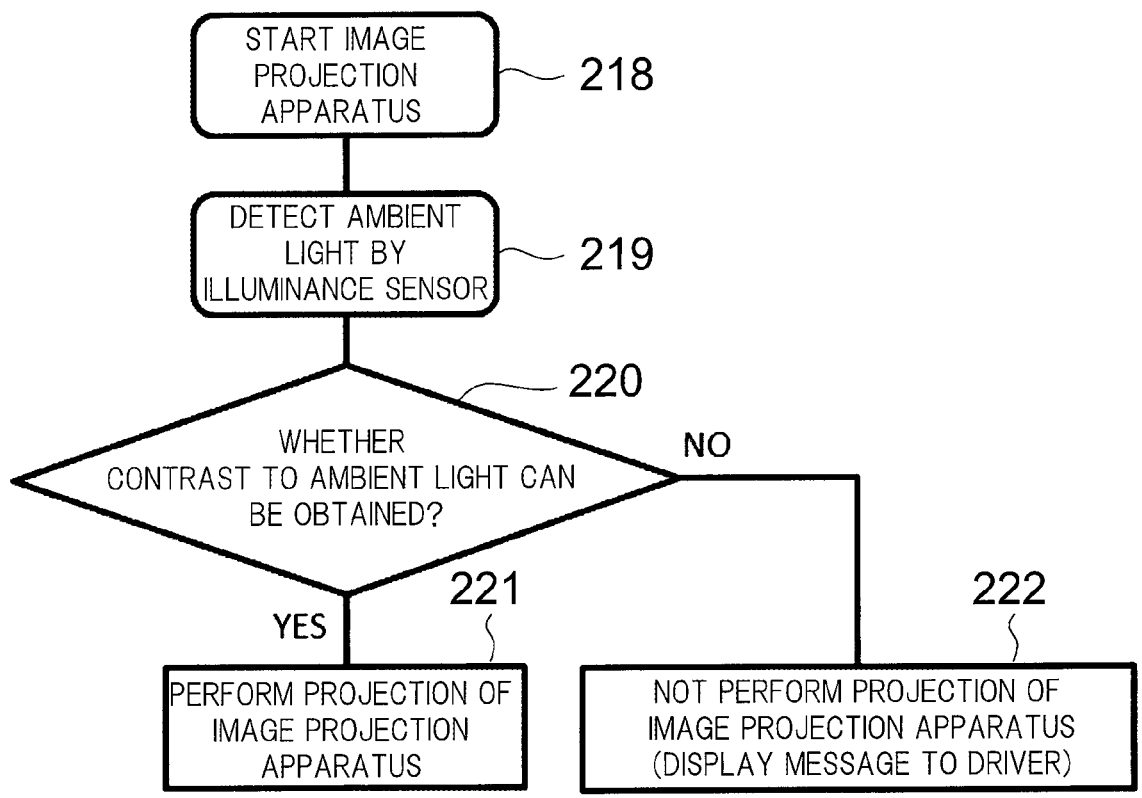

FIGS. 7(A) and (B) are diagrams illustrating a control form of the headlight and the image projection apparatus in accordance with the vehicle speed;

FIG. 8 is an operation flow diagram of the control form of FIG. 7;

FIGS. 9(A) and (B) are explanatory diagrams for a case of projecting an image on the road surface, while changing brightness of the image in accordance with ON/OFF of the headlight;

FIG. 10 is a diagram illustrating an operation flow of FIG. 9;

FIGS. 11(A) and (B) are explanatory diagrams for a case of projecting an image on the road surface, while changing a display position of the image in accordance with high/low of the headlight;

FIG. 12 is a diagram illustrating an operation flow of FIG. 11;

FIGS. 13(A) and (B) are explanatory diagrams for a case of projecting an image on the road surface, while changing the brightness of the image in accordance with day or night;

FIGS. 14(A) and (B) are explanatory diagrams for a case of projecting an image on the road surface, while changing the brightness of the image in accordance with brightness outside the vehicle;

FIG. 15 is a diagram illustrating an operation flow of FIG. 14;

FIG. 16 is a diagram illustrating an operation flow of projecting an image on the road surface, while changing the brightness of the image in accordance with day or night (brightness outside the vehicle);

FIG. 17 is a diagram illustrating an operation flow of projecting an image on the road surface in accordance with the brightness outside the vehicle;

FIGS. 18(A) and (B) are diagrams for describing an irradiation region of the headlight and a projection region of an image by an image projection apparatus according to another embodiment of the present invention;

FIGS. 19(A) and (B) are diagrams illustrating an example of a specific configuration for separately forming the projection region of the image in the irradiation region of the headlight in the other embodiment described above;

FIGS. 20(A), (B), and (C) are diagrams illustrating an example of the projection region of the image separately formed in the irradiation region of the headlight by the configuration described above; and FIG. 21 is a diagram illustrating another example of the specific configuration for separately forming the projection region of the image in the irradiation region of the headlight in the other embodiment described above.

DETAILED DESCRIPTION OF PREFERRED EMBODIMENTS

Hereinafter, embodiments of the present invention will be described in detail with reference to the accompanying drawings.

<Arrangement of Image Projection Apparatus>

First, FIGS. 1(A) and 1(B) illustrate a passenger car as an example of a vehicle 10 which mounts an image projection apparatus according to an embodiment of the present invention, and as illustrated in these figures, a pair of left and right headlights (HL) 11 is provided in front of a main body of the vehicle (passenger car) 10. In the example of FIG. 1(A), although not illustrated in detail here, a lamp as a light emitter is incorporated in each of the pair of headlights 11. Also, in the example of FIG. 1(A), two image projection apparatuses, that is, a pair of left and right image projection apparatuses described in detail below are mounted in the vehicle (passenger car) 10. Then, two image lights from the image projection apparatuses are projected onto a road surface ahead of the vehicle through, for example, a pair of left and right transparent window parts 13a and 13b.

14a denotes a projection region projected from an image projection apparatus through the window part 13a on the right side of the vehicle, 14b denotes a projection region projected through the window part 13b on the left side of the vehicle, 15a denotes a projection drawing of one part of an arrow projected in the projection region 14a, and 15b denotes a projection drawing of the other part of the arrow projected in the projection region 14b. By synthesizing these two projection drawings, the arrow indicating that the vehicle turns to the right is projected on a road surface ahead of the vehicle (passenger car) 10. In the example of FIG. 1(A), the projection regions 14a and 14b are separated horizontally, but the projection regions may be separated vertically.

FIG. 1(B) illustrates an example in which only one image projection apparatus is mounted on a front part of a vehicle body. In this case, image light from the image projection apparatus is projected onto a road surface ahead of the vehicle through, for example, a transparent window part 12 provided on the front part of the vehicle body. 16 denotes a projection region projected from one image projection apparatus, and 17 denotes a projection drawing illustrating an arrow projected in this region.

The above-described arrow image projected on the road surface or the like indicates a current or subsequent traveling direction of the vehicle to a pedestrian or the like walking near the vehicle (passenger car) 10, thereby securing higher safety.

Next, FIGS. 2(A) and 2(B) each illustrate a rear side of the vehicle (passenger car) 10 that mounts one image projection apparatus according to the embodiment of the present invention, and red tail lamps 18 and 18' are provided on the rear side of the vehicle body. In the example of FIG. 2(A), although not illustrated in detail, a lamp as a light emitter is incorporated in each of these tail lamps 18 and 18'. Also, in the example of FIG. 2(A), two image projection apparatuses, that is, a pair of left and right image projection apparatuses are mounted, and an arrow indicating that the vehicle turns to the right while moving backward is projected on the road surface behind the vehicle (passenger car) 10 by combining image lights from the image projection apparatuses, for example, two projection drawings through transparent window parts.

Also, FIG. 2(B) illustrates an example in which the image projection apparatus is mounted near the roof of the vehicle body. In the example of FIG. 2(B), similarly to the example of FIG. 1(B), the image light of an arrow indicating that the vehicle turns to the right while moving backward is projected on the road surface behind the vehicle (passenger car) 10 through a transparent window part provided on the rear end of the vehicle body.

In the foregoing, examples in which one or plural (for example, a pair of) image projection apparatuses are mounted on the front and back of the vehicle 10 have been described, but the present invention is not limited to these, and the image projection apparatus may be mounted at any location of the vehicle 10 other than the front and back thereof such as a side mirror part, on the roof, side and bottom of the vehicle body. Also, the image projection apparatus may be integrally incorporated in the headlight or the tail lamp. Namely, in the present invention, the image projection apparatus may be mounted at any location as long as a desired image can be projected on the road surface or the like by the image projection apparatus. In a case where the image projection apparatus is integrally incorporated in the headlight or the tail lamp, a light source of the headlight or the tail lamp can be used also as a light source for projection.

<Configuration of Light Control ECU>

Figure 3:
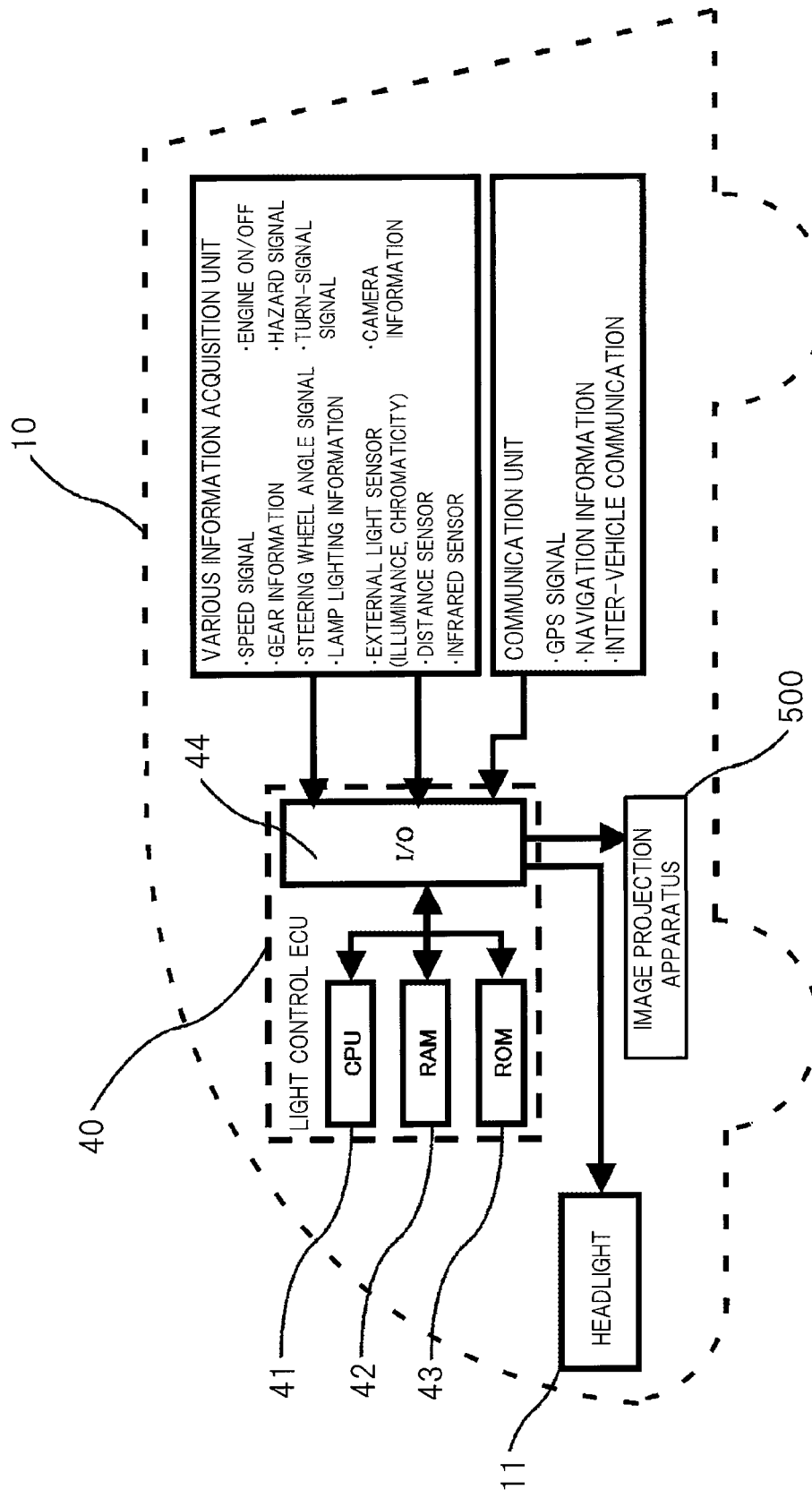
FIG. 3 is a diagram illustrating an overall configuration of a light control ECU constituting the image projection apparatus.

Subsequently, FIG. 3 illustrates an example of a configuration of an electronic control unit (light control ECU) mounted in the vehicle 10 described above. As apparent from the figure, a light control ECU 40 includes a central processing unit (CPU) 41, RAM 42 and ROM 43 as storage means, and an input/output device (I/O unit) 44. The light control ECU 40 receives information input from a various information acquisition unit and a communication unit described below via the I/O unit 44, and controls driving of the headlight 11 and image projection of an image projection apparatus 500.

Note that the information from the various information acquisition unit includes, for example, a speed signal indicating a traveling speed of the vehicle 10, a signal indicating an engine state (ON/OFF), gear information indicating a gear position, a hazard signal notifying surrounding drivers of existence of danger, a steering wheel angle signal indicating a steering angle of a steering wheel, a turn-signal signal indicating presence/absence of a turn signal (referred to also as a "blinker") and which of the left and right is lighting/blinking, and further lamp lighting information indicating lighting/blinking states of the various lamps.

The information from the various information acquisition unit further includes, for example, information from an external light sensor which detects light (brightness) outside the vehicle (illuminance signal, chromaticity signal, and the like), image information from a camera attached to the vehicle, a signal from a distance sensor which detects a distance to another vehicle running around the vehicle 10 such as in front of it or other objects, and further a signal from an infrared sensor which detects a situation outside the vehicle in the nighttime.

In addition, the information from the communication unit includes, for example, a GPS (Global Positioning System) signal for determining a position of the vehicle 10, so-called navigation information that is information from a navigation device which performs route guidance and the like, and further information of inter-vehicle communication performed with another vehicle and road-to-vehicle communication performed between the road and the vehicle.

Figure 4:
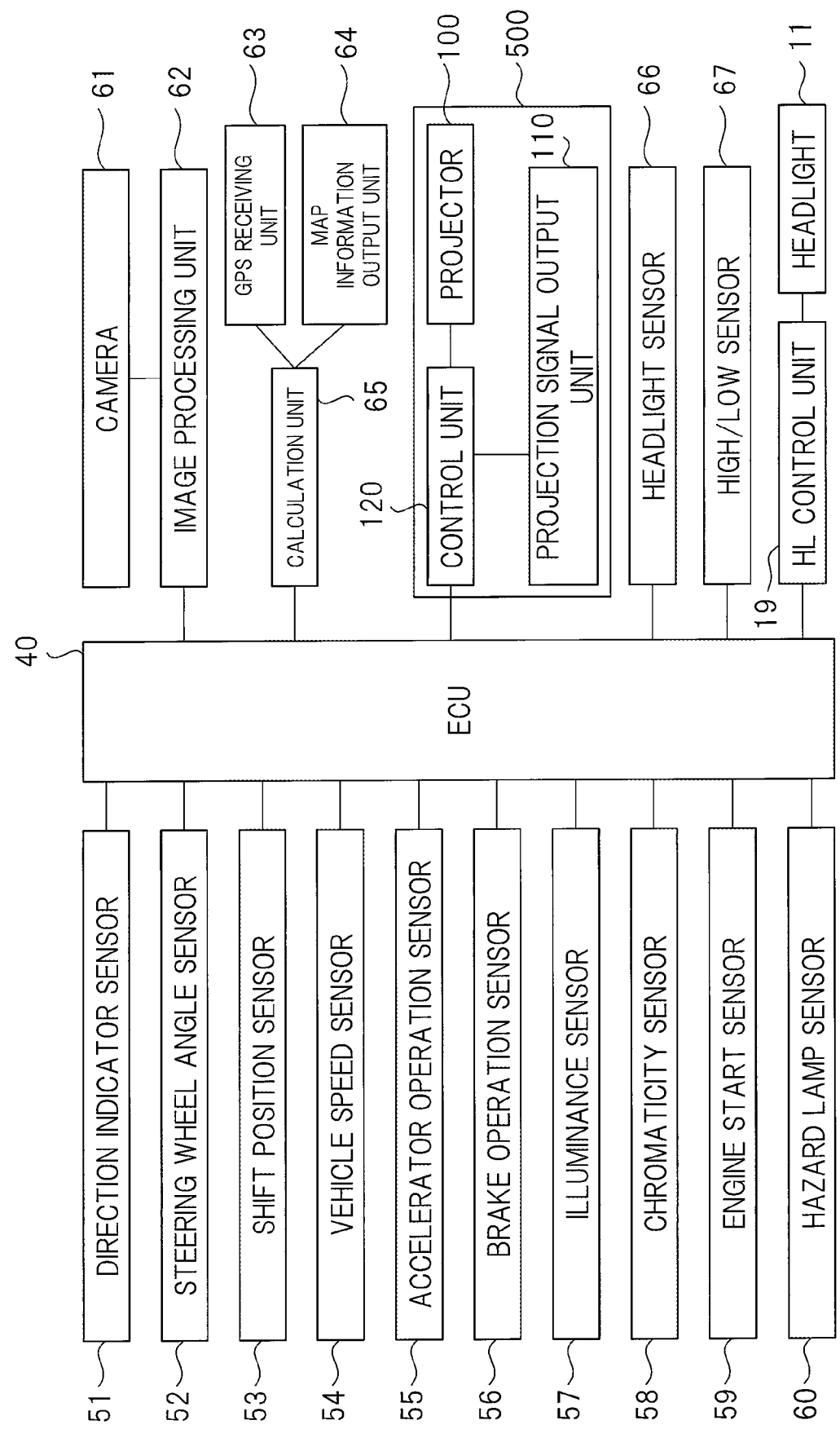
FIG. 4 is a block diagram illustrating a further detailed configuration example of the light control ECU and its peripheral elements.

FIG. 4 illustrates a further detailed configuration of the light control ECU 40 and its peripheral elements described above. Namely, signals from a direction indicator sensor 51, a steering wheel angle sensor 52, a shift position sensor 53, a vehicle speed sensor 54, an accelerator operation sensor 55, a brake operation sensor 56, an illuminance sensor 57, a chromaticity sensor 58, an engine start sensor 59, and a hazard lamp sensor 60 are input to the light control ECU 40. Further, a signal from a camera 61 is input to the light control ECU 40 via an image processing unit 62, and signals from a GPS receiving unit 63 and a map information output unit 64 are input to the light control ECU 40 via a calculation unit 65.

Also, a projector 100 constituting the image projection apparatus 500 receives a control signal input from the light control ECU 40 and a signal input from a projection signal output unit 110 (image signal projected on the road surface or the like) via a control unit 120, whereby projection of an image onto the road surface or the like described below is executed.

In addition, the light control ECU 40 further receives signals input from a headlight sensor 66 indicating lighting and turning-off of the headlight and brightness during lighting, and a signal input from a high/low sensor 67 indicating a high/low state of a light beam during the lighting of headlight. The sensor unit is configured of these sensors 51 to 60, 66, and 67.

Further, brightness of the headlight 11 is controlled by the light control ECU 40 via a headlight control unit (HL control unit) 19.

<Image Projection Apparatus>

Subsequently, an example of a further detailed configuration of the image projection apparatus 500 including the projector 100, the projection signal output unit 110, and the control unit 120 illustrated in FIG. 4 will be described below with reference to FIG. 5.

A projection optical system 501 constituting the projector 100 is an optical system for projecting an image onto the road surface or the like, and includes a lens and/or a mirror. A display device 502 is a device which generates an image by modulating transmitting light or reflecting light, and for example, a transmissive liquid crystal panel, a reflective liquid crystal panel, or a DMD (Digital Micromirror Device) panel (registered trademark) is used. A display device driving unit 503 sends a driving signal to the display device 502, and causes the display device 502 to generate an image. A light source 505 generates light for image projection, and a high pressure mercury lamp, a xenon lamp, an LED light source, a laser light source, or the like is used. A power source 506 supplies power to the light source 505. Further, the power source 506 supplies necessary power to each of other units. An illumination optical system 504 collects and uniformizes the light generated by the light source 505, and emits the light to the display device 502. A cooling unit 515 cools each part to be in a high temperature state such as the light source 505, the power source 506, or the display device 502 by an air cooling method or a liquid cooling method as necessary. An operation input unit 507 is an operation button or a light receiving unit of a remote controller, and receives an operation signal input from a user.

An image signal input unit 531 is connected to an external image output device to receive image data input from the external image output device. An audio signal input unit 533 is connected to an external audio output device to receive audio data input from the external audio output device. An audio output unit 540 is capable of outputting audio based on the audio data input to the audio signal input unit 533. Also, the audio output unit 540 may output an incorporated operation sound or error warning sound. A communication unit 532 is connected to, for example, an external information processing device to input and output various control signals.

A nonvolatile memory 508 stores various data to be used in a projector function. The data stored in the nonvolatile memory 508 includes picture data and image data prepared in advance for the projection onto the road. A memory 509 stores the image data to be projected and control parameters of each unit of the apparatus. A control unit 510 controls operation of each of connected units.

An image adjustment unit 560 performs image processing to the image data input by the image signal input unit 531 and the picture data and the image data stored in the nonvolatile memory 508. The image processing includes, for example, scaling processing that performs enlargement, reduction, and deformation of the image, brightness adjustment processing that changes brightness, contrast adjustment processing that changes a contrast curve of the image, and retinex processing that decomposes the image into light components and changes weighting for each component.

A storage unit 570 records the image, picture, audio, and various data. For example, the image, picture, audio, and various data may be recorded in advance at the time of product shipment, or the image, picture, audio, and various data acquired from an external device, an external server, or the like via the communication unit 532 may be recorded. The image, picture, various data and the like recorded in the storage unit 570 may be output as a projection image via the display device 502 and the projection optical system 501. The audio recorded in the storage unit 570 may be output as audio from the audio output unit 540.

As described above, the image projection apparatus 500 can mount various functions. However, the image projection apparatus 500 does not necessarily have to include all the configurations described above. The image projection apparatus 500 may have any configuration as long as it has a function of projecting the image.

Figure 6:
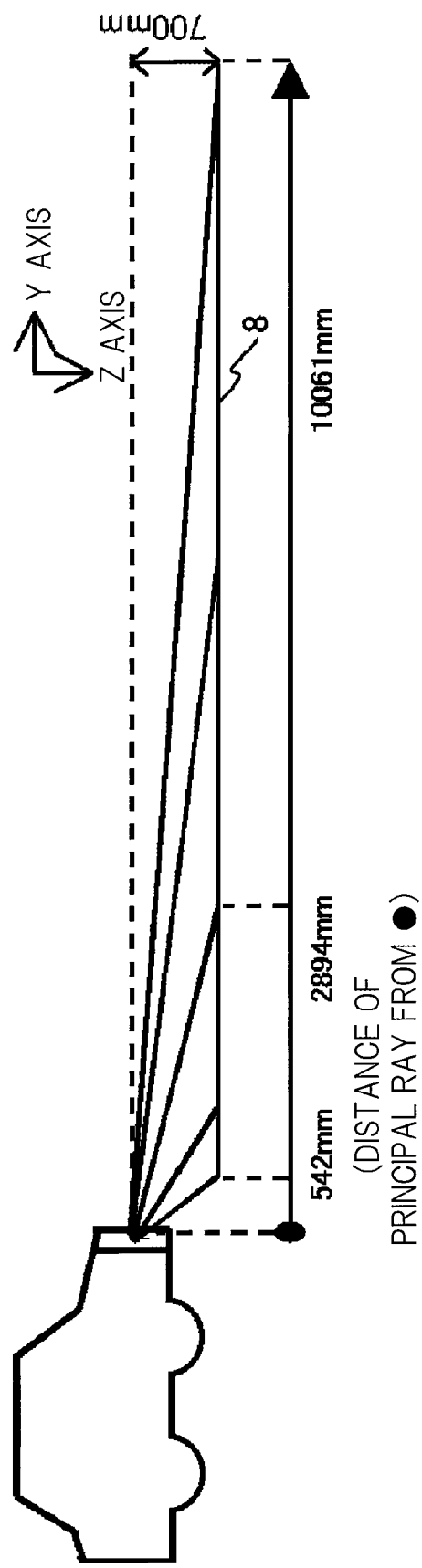
FIG. 6 is an explanatory diagram for a case of projecting an image on a road surface in a state where a headlight is controlled in accordance with vehicle speed.

FIG. 6 is a ray diagram of a projector 100 including an image plane. In this figure, the image light, which is emitted from the light source constituted of an LED or the like (not illustrated) and transmits through the image display device, passes through a filter and the like, is refracted by various lens systems, and is further reflected in accordance with the configuration, and is then projected on an image plane 8 (road surface or the like).

In this manner, in the image projection apparatus 500 described above, the length of the long side of the range of the projection image is 10061−542=9519≈9520 mm with respect to the projection distance of 700 mm, and thus an unprecedented wide angle of view with the projection ratio of 700/9520≈0.07 is realized.

Then, since the vehicle 10 runs in the nighttime while lighting the headlight 11, light beam from the headlight 11 is emitted on the image plane (road surface or the like) 8. Accordingly, on the image plane (road surface or the like) 8 in the nighttime, the projection image from the image projection apparatus 500 and the light beam from the headlight 11 are emitted in an overlapped manner.

Figure 1:
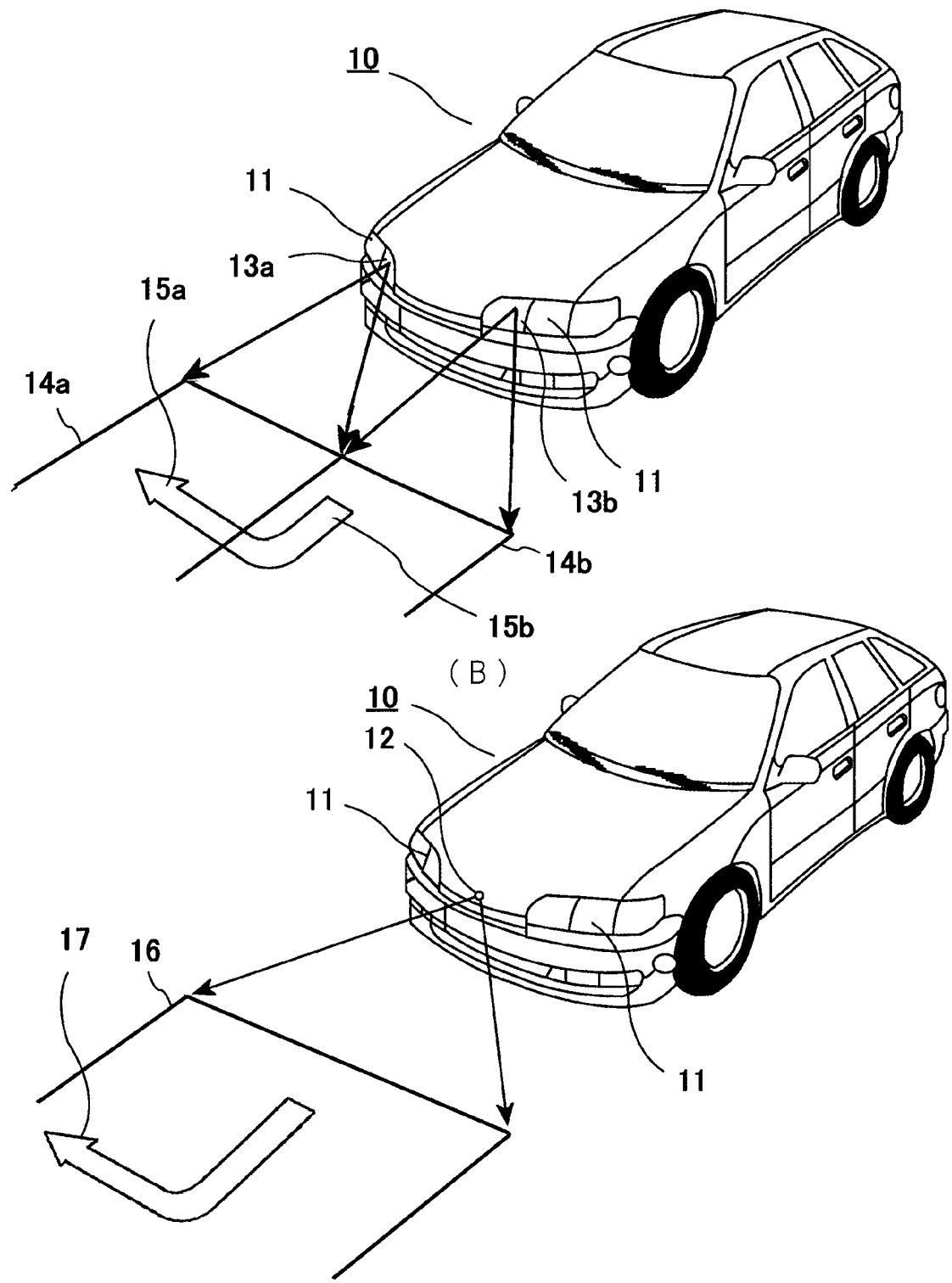

In the foregoing, one image projection apparatus 500 and the projection optical system thereof have been described, but one or plural (for example, a pair of) projectors may be mounted on the vehicle (or integrally incorporated in the headlights or tail lamps) in the present invention as described above such that a desired image is projected on the road surface or the like. At that time, in a case of the plural (for example, the pair of) image projection apparatuses 500 as illustrated in FIG. 1 (A) and FIG. 2(A) in particular, the same image may be projected on the road surface or the like from each of the image projection apparatuses 500 (in this case, the same image is displayed on the display device 502 of FIG. 5), or different images may be projected from the left and right image projection apparatuses 500 and synthesized together on the road surface or the like (in this case, an image obtained by dividing the desired image into left and right is displayed on the display device 502 of FIG. 5).

In the foregoing, as the image projection apparatus 500 that projects the image on the road surface or the like, the configuration using the transmissive liquid crystal image display device has been described, but the present invention is not limited to this. For example, a reflective image projection apparatus 500 constituted of a micromirror such as a DLP (Digital Light Processing) apparatus and an image projection apparatus 500 capable of projecting image light from a light modulable planar light emitting diode via the projection optical system can also be used as the image projection apparatus 500 in addition to that described above. Namely, in the present invention, any image projection apparatus 500 may be used as long as the desired image can be projected on the road surface or the like by the image projection apparatus 500.

<Control of Projection Image onto Road Surface or the Like>

Subsequently, specific examples of various images projected on the road surface or the like based on a relationship with vehicle information in the configuration in which the above-described headlight and image projection apparatus 500 are mounted on the front side and/or the rear side of the vehicle in the above-described manner will be described in detail with reference to FIGS. 7 to 17. Note that, in the embodiment described below, an arrow is used as an example of the image projected from the image projection apparatus 500, but the image is not limited to this, and may be a shape indicating a direction, character information, or the like.

FIG. 7 illustrates a control form of light of the headlight and an arrow image of the image projection apparatus 500 projected on the road surface ahead of the vehicle 10 at the time of deceleration during traveling of the vehicle in the nighttime. 21 denotes a projection region of the headlight projected on the road surface, 22 denotes a projection region projected by the image projection apparatus 500, and 23 denotes an arrow image projected in the projection region 22. The light of the headlight and the arrow image of the image projection apparatus 500 are projected in the projection region 22 in an overlapped manner.

At a normal speed, based on the signal from the vehicle speed sensor 54 illustrated in FIG. 4, the headlight emits light on the road surface with normal brightness, and the image projection apparatus 500 projects the arrow image 23 on the road surface with normal brightness (FIG. 7(A)). When the vehicle decelerates or stops, based on the signal of the vehicle speed sensor 54, the headlight emits light dimmer than usual on the road surface within a range stipulated by laws and regulations, and the image projection apparatus 500 projects the arrow image 23 on the road surface with the same brightness as the above (FIG. 7(B)).

Note that the control of brightness in the image projection apparatus 500 can be performed by a brightness adjustment processing function of the image adjustment unit 560. Also, the control may be performed by the number of LEDs to be lit or pulse width modulation in the configuration including a plurality of LEDs as a light source. By performing the control in this way, the image of the image projection apparatus 500 is emphasized at the time of deceleration or stop of the vehicle, and it is thus possible to arouse people's attention, reliably present (warn) the current or subsequent traveling direction of the vehicle to surrounding drivers and pedestrians, and secure higher safety.

In the example illustrated in FIG. 7, the headlight is dimmed without changing brightness of the image from the image projection apparatus 500, but the present invention is not limited to this, and the brightness of the image from the image projection apparatus 500 may be increased without changing the brightness of the headlight or the brightness of the headlight may be decreased while increasing the brightness of the image from the image projection apparatus 500. Namely, if control to make the brightness of the image from the image projection apparatus 500 relatively higher than the headlight is performed at the time of deceleration or stop of the vehicle, it is possible to secure higher safety similarly to the above.

Note that the example illustrated in FIG. 7 is effective in a case where it is difficult to change the brightness of the image from the image projection apparatus 500.

FIG. 8 schematically illustrates an operation flow of the control form of FIG. 7. When the light control ECU 40 detects deceleration or stop of the vehicle 10 in step 201 based on the speed signal from the vehicle speed sensor 54 received in step 200, the brightness of the image projection apparatus 500 is controlled in step 202, and the brightness of the headlight is controlled in step 203. The control of brightness in the image projection apparatus 500 is performed by the control unit 510 illustrated in FIG. 5, and the control of brightness in the headlight is performed by the headlight control unit (HL control unit) 19.

In the image projection from the image projection apparatus 500 at the time of backward movement of the vehicle 10 illustrated in FIG. 2, the control form illustrated in FIGS. 7 and 8 is applied because the vehicle 10 moves backward while decelerating. In this case, brightness of a reversing light (backlight) is controlled instead of the headlight.

FIG. 9 illustrates a control form of the light of the headlight projected on the road surface ahead of the vehicle 10 and the arrow image from the image projection apparatus 500 at the time of lighting or turning-off of the headlight in the twilight or the nighttime. 25 denotes a headlight projection region projected on the road surface, 26 denotes a projection region projected by the image projection apparatus 500, and 27 denotes an arrow image projected in the projection region 26. The light of the headlight and the arrow image of the image projection apparatus 500 are projected in the projection region 26 in an overlapped manner.

Based on input of the signal indicating lighting or turning-off from the headlight sensor 66 illustrated in FIG. 4, the arrow image 27 is projected on the road surface with normal brightness from the image projection apparatus 500 during turning-off of the headlight (FIG. 9(A)). Then, during lighting of the headlight, the arrow image 27 is projected from the image projection apparatus 500 with a higher brightness than the normal brightness on the road surface on which the light of the headlight is emitted (FIG. 9(B)).

Normally, since the front of the vehicle becomes bright by the lighting of the headlight (HL), visibility of the image projected on the road surface ahead of the vehicle from the image projection apparatus 500 is degraded. However, by performing the control illustrated in FIG. 9, the reduction of visibility of the arrow image from the image projection apparatus 500 can be prevented by the increase of the brightness even when the headlight is lit. Accordingly, since the arrow image is emphasized even when the headlight (HL) is lit, it is possible to arouse people's attention, reliably present (warn) the traveling direction of the vehicle 10 to surrounding drivers and pedestrians, and secure higher safety.

FIG. 10 schematically illustrates an operation flow of the control form of FIG. 9. The lighting (ON) signal or the turning-off (OFF) signal is output from the headlight sensor 66 in step 204, the light control ECU 40 detects the signal in step 205, and the control is performed to increase brightness from the image projection apparatus 500 in step 206. Note that the control of brightness of the image projection apparatus 500 can be performed by a brightness adjustment processing function of the image adjustment unit 560. Also, the control may be performed by the number of LEDs to be lit or pulse width modulation in the configuration including a plurality of LEDs as a light source.

FIG. 11 illustrates a high/low state of the light of the headlight projected on the road surface ahead of the vehicle 10 and a control form of a projection position of the arrow image from the image projection apparatus 500 in the vehicle traveling in the nighttime. In FIG. 11, a projection region of the image projection apparatus 500 is illustrated, and the projection region may be matched with a projection region of the headlight.

In this control form, the projection position of the arrow image from the image projection apparatus 500 is changed in accordance with the high/low state of the light beam during the lighting of the headlight from the high/low sensor 67 illustrated in FIG. 4. Namely, in the high beam state, an arrow image 28 from the image projection apparatus 500 is projected on a road surface far from the vehicle 10 (FIG. 11(A)), and in the low beam state, the arrow image 28 from the image projection apparatus 500 is projected on a road surface near the vehicle 10 (FIG. 11(B)). Also, when the projection position is farther away, since a viewing angle from the driver becomes small, the image may also be changed in addition to the projection position.

Figure 5:
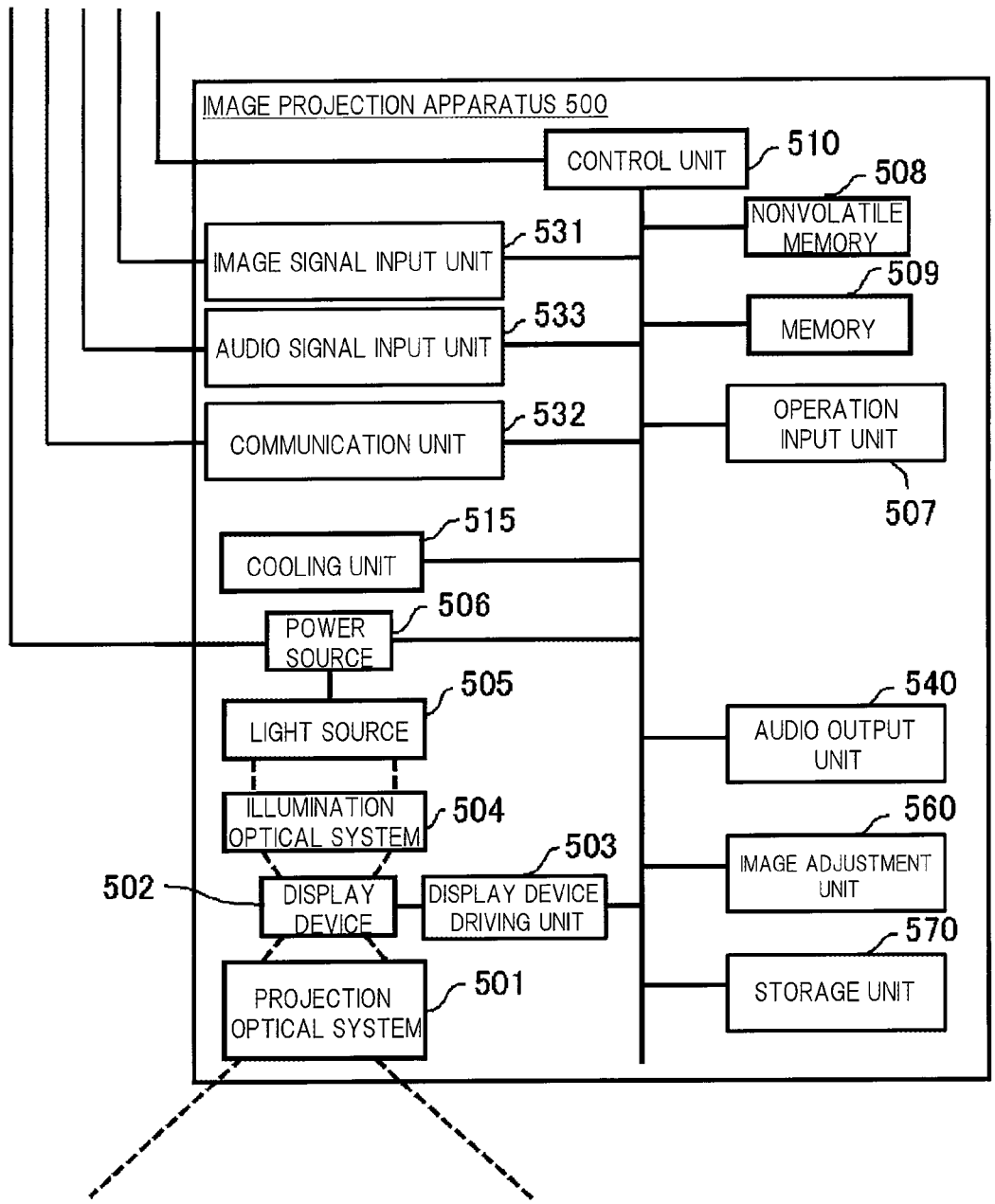
FIG. 5 is a diagram illustrating an example of a configuration of the image projection apparatus.

Specific control for changing the projection position of the arrow image from the image projection apparatus 500 includes a case of controlling the light source 505 in FIG. 5, a case of controlling the projection optical system 501, and a case of changing a used portion of a liquid crystal panel of the display device 502.

In the case of controlling the light source 505, the projection position is changed by changing positions of the LEDs to be lit in the configuration including a plurality of LEDs as a light source. Namely, an irradiation direction of the arrow image from the projection optical system 501 is changed by changing the positions of the LEDs to be lit, so that the projection position of the arrow image on the road surface is changed.

In the case of controlling the projection optical system 501, the irradiation direction of the arrow image is changed by mechanically changing the optical axis of the projection optical system 501, so that the projection position of the arrow image on the road surface is changed.

In the case of changing the used portion of the liquid crystal panel of the display device 502, when the light control ECU 40 detects a high beam signal, it controls the image projection apparatus 500, and the display device driving unit 503 in the image projection apparatus 500 sends the driving signal to the display device 502 to generate the image while changing the used portion of the liquid crystal panel of the display device 502 such that the image is projected on the road surface far from the vehicle. Similarly, when the light control ECU 40 detects a low beam signal, the display device driving unit 503 in the image projection apparatus 500 sends the driving signal to the display device 502 to generate the image while changing the used portion of the liquid crystal panel of the display device 502 such that the image is projected on the road surface near the vehicle.

FIG. 12 schematically illustrates an operation flow of the control form of FIG. 11. When a high or low signal is output from the high/low sensor 67 in step 207, the light control ECU 40 detects the signal in step 208, and controls the projection (display) position of the arrow image of the image projection apparatus 500 in accordance with each signal in step 209.

The projection position may be changed in accordance with a combination of the high/low signal of the headlight and the vehicle speed. For example, the projection position is controlled so as to project the image at a short distance during low-speed driving in the low beam state of the headlight, at a medium distance during medium-speed driving in the high beam state of the headlight, and at a long distance during high-speed driving.

Normally, the headlight is in the high beam state in a case where there are no oncoming vehicles or people during traveling of the vehicle, and the headlight is in the low beam state to prevent dazzling in a case where there are oncoming vehicles and people. According to this control form, since the arrow image from the image projection apparatus 500 is projected on the road surface near the vehicle when there are other vehicles and people near the vehicle, the arrow image is emphasized, and it is thus possible to arouse people's attention, reliably present (warn) the traveling direction of the vehicle to surrounding drivers and pedestrians, and secure higher safety.

In addition, the driver of the vehicle 10 directs his/her line of sight to a place near the vehicle 10 in the low beam state of the headlight, and moves his/her line of sight to a distant place in the high beam state. According to the light control described above, since the arrow image from the image projection apparatus 500 is projected in a direction of the line of sight of the driver of the vehicle 10, attention of the driver of the vehicle 10 is also aroused, and it is thus possible to secure higher safety.

FIG. 13 illustrates a control form of changing the brightness of the image from the image projection apparatus 500 in accordance with brightness of day or night. 29 and 30 respectively denote arrow images from the image projection apparatus 500 in the daytime and the nighttime, and 31 denotes an image of a projection region around the arrow image.

In the daytime, brightness of the arrow image 29 from the image projection apparatus 500 is increased, and brightness of the image 31 around the arrow image 29 is decreased (FIG. 13(A)). On the other hand, in the nighttime, brightness of the arrow image 30 is decreased, and brightness of the image 31 around the arrow image 30 is increased (FIG. 13(B)).

FIG. 14 illustrates a control form of changing the brightness of the image from the image projection apparatus 500 in accordance with brightness outside the vehicle. 32 and 33 respectively denote arrow images from the image projection apparatus 500 when the outside is bright and dark, and 31 denotes an image of a projection region around the arrow image.

Based on a brightness signal from the illuminance sensor 57 illustrated in FIG. 4, when the outside of the vehicle is bright, brightness of the arrow image 32 from the image projection apparatus 500 is increased (for example, colored), and brightness of the image 31 around the arrow image is decreased (FIG. 14(A)). On the other hand, when the outside of the vehicle is dark (at night or in a tunnel), brightness of the arrow image 33 is decreased (for example, outline), and brightness of the image 31 around the arrow image is increased (FIG. 14(B)).

According to the control forms illustrated in FIGS. 13 and 14 described above, since brightness of the arrow image is increased when the outside is bright, it becomes easy to visually recognize the arrow image, and it is thus possible to reliably perform presentation (warning) to surrounding drivers and pedestrians and secure higher safety. On the other hand, since it is easy to visually recognize the arrow image when the outside is dark, it is possible to brighten the surroundings by decreasing the brightness of the arrow image and increasing the brightness around the arrow image, and it is thus possible to reliably perform presentation (warning) to surrounding drivers and pedestrians and secure higher safety by brightening the surroundings.

In particular, according to the projection image onto the road surface or the like of FIG. 14, it is easy for the surrounding drivers and pedestrians to recognize the traveling direction of the vehicle 10, and when the arrow image is projected based on a signal from navigation information, it is easy also for the driver of the vehicle 10 to recognize a route to which the vehicle 10 should enter at the intersection, and it is thus possible to secure higher safety. Note that sizes and colors of the arrow and the like may be varied in accordance with the weather, time zone, or ambient brightness.

FIG. 15 schematically illustrates the control of FIG. 14. The brightness outside the vehicle is detected by the illuminance sensor 57 in step 210, and a detection signal of the illuminance sensor 57 is input to the light control ECU 40 in step 211. Then, in step 212, the light control ECU 40 controls the image projection apparatus 500 based on the brightness detection signal, and controls the brightness of the arrow image and the brightness around the arrow image.

FIG. 16 illustrates an operation flow of switching the light source of the image projection apparatus 500 between a high brightness light source and a normal light source in accordance with day or night (FIG. 13) or the brightness outside the vehicle (FIG. 14).

The image projection apparatus 500 is started in step 213, ambient light is detected by the illuminance sensor in step 214, and day or night is determined in step 215. In the case where it is in the daytime, the high brightness light source is driven in the image projection apparatus 500 in step 216, and in the case where it is not in the daytime, the normal light source with lower brightness is driven in the image projection apparatus 500 in step 217.

Here, a laser light source is used as the high brightness light source, and an LED light source is used as the normal light source. Namely, two types of light sources such as the laser light source (first light source) and the LED light source (second light source) are provided as the light source 505 in FIG. 5, and a necessary brightness can be obtained by selecting the light source to be driven depending on the night or day or the brightness outside the vehicle. Since the pupil opens when it is in the nighttime or the surroundings are dark, the LED light source is preferably used.

Since the laser light as the high brightness light source is parallel light with excellent directivity and thus does not diffuse during projection, the brightness is less likely to decrease along the way, and it is possible to display the arrow image with high brightness on the road surface. A laser scanning type that displays the arrow part by laser scanning is used for the laser light source. When the laser light is used in this way, the arrow image can be displayed on the road surface with the brightness having high visibility even in a case where the outside of the vehicle is bright, and it is thus possible to reliably perform presentation (warning) to the surrounding drivers and pedestrians and secure higher safety.

In addition, it is also possible to obtain a necessary high brightness by providing a plurality of LEDs as the high brightness light source and individually lighting the LEDs. Namely, in the case of the normal low brightness light source, a small number of LEDs are lit, and in the case of the high brightness light source, a large number of LEDs are lit. In this case, since the brightness can be changed in multiple stages by changing the number of LEDs to be lit, for example, if irradiation is performed with the minimum brightness capable of maintaining a high visibility state depending on a degree of brightness (illuminance) outside the vehicle, the high brightness light source can be driven with energy saving.

The control forms of FIGS. 13 to 16 are adaptable to the image projection of the image projection apparatus 500 at the time of backward movement of the vehicle illustrated in FIG. 2. According to the projection image onto the road surface or the like of such control forms, it is possible to reliably perform presentation (warning) to surrounding drivers and pedestrians and secure higher safety particularly in a case of parking in a garage.

FIG. 17 illustrates an operation flow of determining whether to perform projection of the image projection apparatus 500 in accordance with the brightness outside the vehicle (FIG. 14). After the image projection apparatus 500 is started in step 218, ambient light outside the vehicle is detected by the illuminance sensor 57 in step 219. Then, it is determined in step 220 whether the projection image (arrow) of the image projection apparatus 500 can have a sufficient contrast to the ambient light detected by the light control ECU 40.

If the projection image can have the sufficient contrast, the arrow image projected on the road surface can be visually recognized easily, and it is possible to reliably perform presentation (warning) to surrounding drivers and pedestrians and secure higher safety. However, if the projection image cannot have the sufficient contrast, since it is difficult for the surrounding drivers and pedestrians to visually recognize the arrow image projected on the road surface and safety cannot be secured, it is useless to perform the projection from the image projection apparatus 500.

Accordingly, when it is determined that the sufficient contrast can be obtained in step 220, a projection command is output from the light control ECU 40 to the image projection apparatus 500 in step 221. On the other hand, when it is determined that the sufficient contrast cannot be obtained in step 220, the projection command is not output from the light control ECU 40 to the image projection apparatus 500 in step 222. At this time, a message stating that no projection command is output is displayed for the driver.

<Separation of Irradiation/Display Regions by Headlight and Image Projection Apparatus>

In the above embodiment, the image displayed on the road surface from the image projection apparatus has been described as being projected mainly in the irradiation region by the headlight of the vehicle during traveling in the nighttime or in the tunnel, but the present invention is not limited to the above embodiment. Namely, in a case where the display region by the image projection apparatus according to the present invention overlaps with the irradiation region by the headlight, it is considered that the contrast of the image projected on the road surface from the image projection apparatus is decreased due to irradiation light by the headlight, and visibility of the image is degraded (deteriorated). Therefore, in the present invention, the problem described above is solved by a so-called display region forming unit, which is arranged in the headlight 11 and separates (divides) the irradiation region by the headlight and the projection region by the image projection apparatus from each other, and details of its embodiment will be described below.

Figure 18:
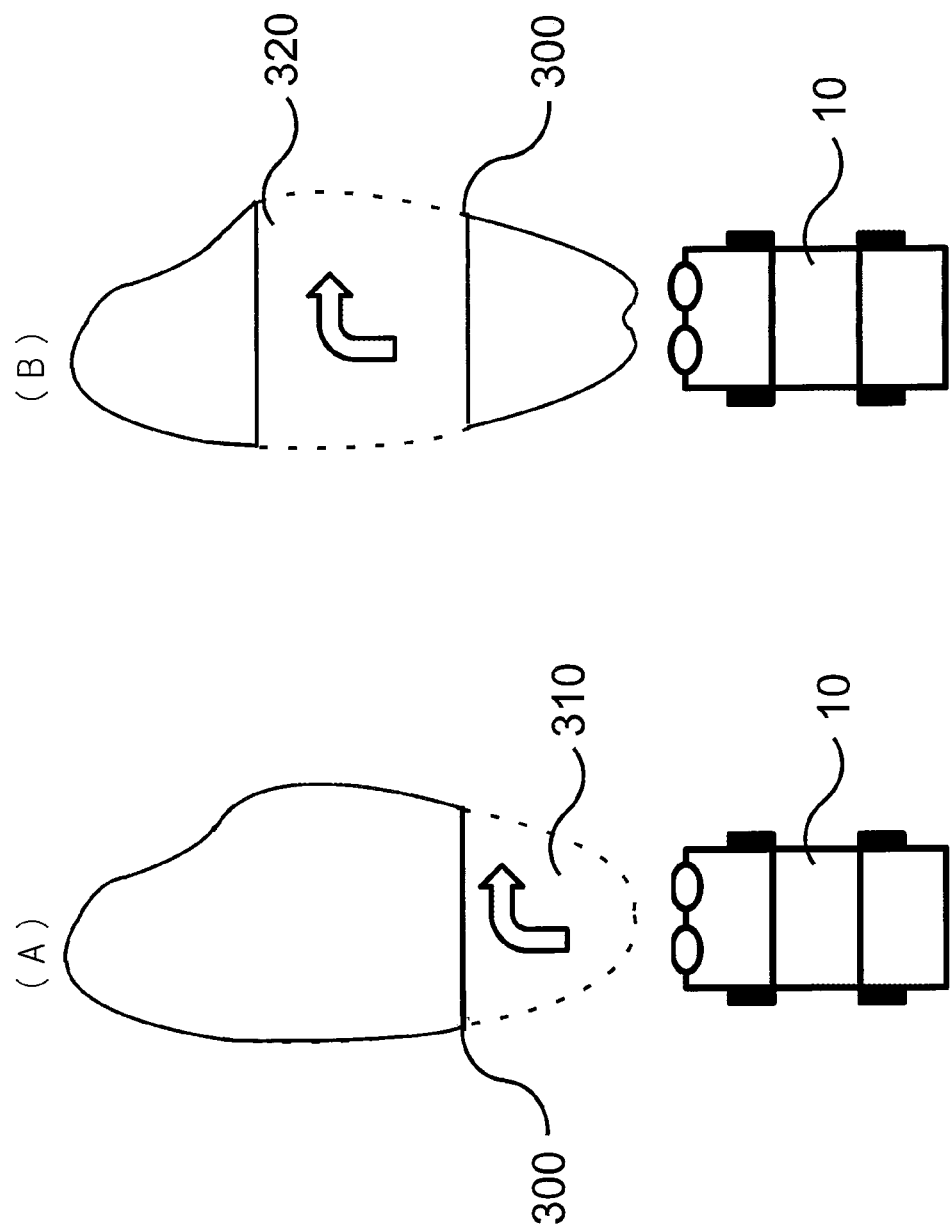

FIG. 18 illustrates a state in which the irradiation region by the headlight and the display region by the image projection apparatus are separated from each other by the display region forming unit according to this embodiment. In particular, FIG. 18(A) illustrates a case where the display region by the image projection apparatus is set in a relatively close region 310 ahead of the vehicle (for Example, a range from 0 m to 10 m ahead of the vehicle: hereinafter referred to as a "near region") with respect to an irradiation region 300 by the headlight ahead of the vehicle 10, and FIG. 18(B) illustrates a case where the display region by the image projection apparatus is set in a relatively far region 320 ahead of the vehicle (for example, a range from 10 m to 20 m ahead of the vehicle: hereinafter referred to as a "far region") with respect to the irradiation region 300.

More specifically, in FIG. 18(A), in the region 300 (normally, a range from 0 m to 40 ahead of the vehicle) irradiated by the light from the headlight, illumination light that corresponds to a part of light of the headlight and reaches the near region is blocked, so that the region 310 where the illumination light from the headlight is blocked (=near region) is set as the display region and the projection image by the image projection apparatus is displayed in the near region 310. On the other hand, in FIG. 18(B), in the irradiation region 300 of the headlight, the illumination light that reaches the far region is blocked, so that the region 320 where the illumination light from the headlight is blocked (=far region) is set as the display region and the projection image by the image projection apparatus is displayed in the far region 320. Note that the display regions of the projection image by the image projection apparatus, that is, the near region 310 and the far region 320 do not exceed the irradiation region 300 by the headlight.

Then, if the image (in this example, the arrow to indicate the traveling direction of the vehicle 10) by the image projection apparatus described above (see reference 500 of FIGS. 3 to 5) is projected in the near region 310 or the far region 320 formed in the above-described manner, reduction of the contrast of the projected image is eliminated, and the visibility of the projection image is improved particularly during lighting of the headlight, so that it is possible to reliably perform presentation (warning) to surrounding drivers and pedestrians and secure higher safety. At this time, it is most preferable that the image including the arrow is displayed by, for example, a black-out image on a white background because the projection light from the image projection apparatus can be used as a part of the irradiation light from the headlight and illumination efficiency can be improved. Note that the black-out image on a white background mentioned here means that an image portion to be projected is formed with color light with excellent discrimination, and light color in a region other than the image portion is formed with white light.

Figure 20:
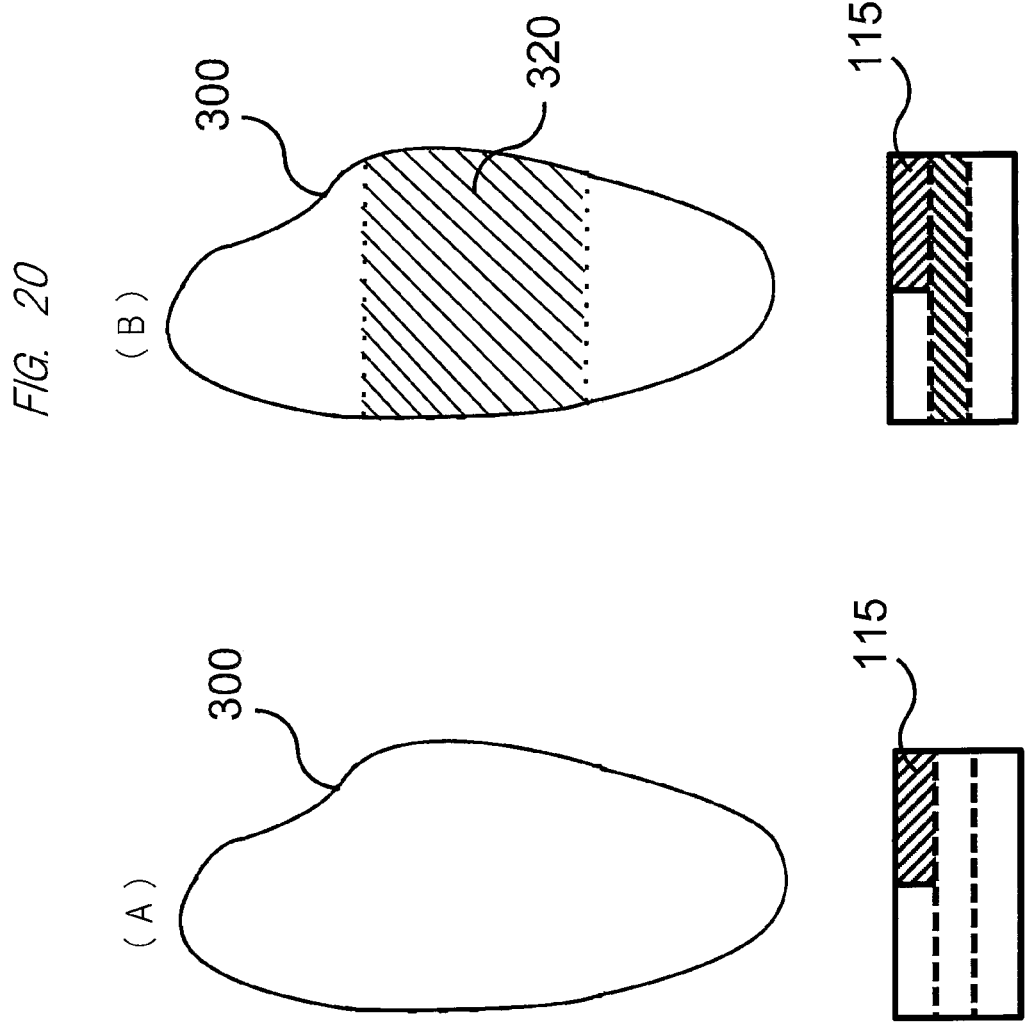

Next, a specific configuration of the display region forming unit with which the above-described near region 310 or far region 320 which is an image display region for displaying the image from the image projection apparatus is formed in the irradiation region 300 by the headlight by changing the irradiation region of the irradiation light from the headlight will be described in detail below with reference to FIGS. 19 and 20.

First, FIG. 19 illustrates a configuration in which the above-described near region 310 or far region 320 is formed by blocking a part of the light emitted from the headlight (see reference 11 of FIG. 3 or 4) by the use of a so-called shade. In particular, FIG. 19(A) is a cross section illustrating the overall configuration of the headlight including the light-blocking configuration, and FIG. 19(B) is a partial perspective view illustrating the overall configuration of the headlight centered on the light-blocking configuration.

In FIG. 19(A), a light source 112 made up of, for example, an LED is arranged on a base plate 111, and a reflection plate 113 for collecting the light emitted from the light source 112 and converting the light into emission light from a predetermined position (for example, a mirror having a hemispherical reflection surface obtained by rotating an ellipse) is attached around the light source 112. Further, the light collected by the reflection plate 113 is condensed by an optical device 114 such as a lens and emitted forward from a glass front surface of the headlight 11. Further, a shade 115 which is means of forming the near region 310 or the far region 320 by blocking a part of the light emitted from the headlight 11 is provided in the course of the optical path toward the optical device 114.

As illustrated also in FIG. 19(B), the shade 115 is configured of a plurality of (in this example, three) plate members (blades) 115-1, 115-2, and 115-3 rotatably attached around a common rotation shaft 116, and the plate members are set at respective angular positions by rotation means such as a motor (not illustrated) in this case. Namely, if a part of the light from the light source 112 is blocked by each of the three blades 115-1, 115-2, and 115-3, in other words, the light is emitted toward the front of the headlight 11 through the optical device 114 such as the lens after passing through a shade opening formed by the combination of the three blades 115-1, 115-2, and 115-3, it is possible to obtain the illumination light that irradiates the predetermined region 300 and includes the desired image display region 310 or 320 as illustrated in FIGS. 20(A) to 20(C).

Figure 21:
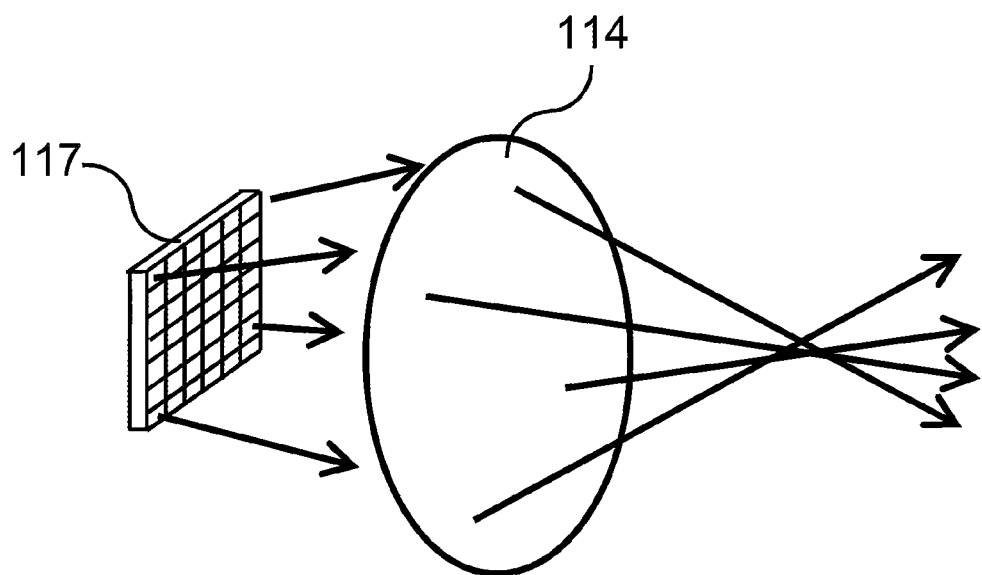

Alternatively, instead of the above, for example, if the headlight 11 with a configuration in which light from a planar light source 117 formed by arranging a plurality of LEDs in an array on a surface is emitted toward the front of the headlight 11 through the optical device 114 such as the lens as illustrated in FIG. 21 is used, it is possible to obtain the illumination light that irradiates the predetermined region 300 and includes the desired image display region 310 or 320 similarly to FIG. 20(A) to FIG. 20(C) by controlling the lighting of a part of the plurality of LEDs constituting the planar light source 117.

According to the embodiment described in detail above, since the image display region 310 or 320 for projecting the image from the image projection apparatus is separately formed as appropriate in the irradiation region 300 formed ahead of the headlight 11, the display region by the image projection apparatus does not overlap with the irradiation region by the headlight. For that reason, the contrast of the projection image is not decreased and its visibility is not degraded (deteriorated), so that it is possible to reliably perform presentation (warning) to surrounding drivers and pedestrians and secure higher safety even at the time of the lighting of the headlight.

Note that, in the embodiment above, the case in which the separation of the irradiation region 300 by the headlight 11 and the image display region 310 or 320 is performed when the image from the image projection apparatus is projected has been described. However, the present invention is not limited to this, and the separation may be performed at all times. Also, regarding a boundary region between the headlight and the image display region 310 or 320 in which the image from the image projection apparatus is projected, if these are overlapped (superposed) with each other or superposed by adding a gradation, the junction (joint) therebetween can be made less noticeable. Note that the gradation may be added to only one of the image display region projected from the image projection apparatus and the irradiation region irradiated from the headlight. In this manner, it is possible to reduce discomfort of the driver during driving and secure higher safety.

Further, in the above embodiment, the arrow for indicating the traveling direction of the vehicle has been described as an example of the image projected in the image display region 310 or 320 by the image projection apparatus. However, the present invention is not limited to this, and can be applied to a case of displaying another image. Also, in the above embodiment, the region obtained by the so-called high beam has been described as the irradiation region 300 irradiated ahead of the headlight 11. However, the present invention is not limited to this, and the illumination light including the desired image display region 310 or 320 can be obtained for the region obtained by the low beam in the same manner as described above. Note that it is also possible to apply the present invention to the light (for example, backlight or the like) other than the headlight.

REFERENCE SIGNS LIST 10 vehicle (passenger car)
11 headlight
12, 13a, 13b window part
14a, 14b, 16 projection region
15a, 15b, 17 projection drawing
18, 18' tail lamp
19 headlight control unit
21 projection region of headlight
22 projection region of image projection apparatus
23 arrow image
40 light control ECU
51 direction indicator sensor
52 steering wheel angle sensor
53 shift position sensor
54 vehicle speed sensor
55 accelerator operation sensor
56 brake operation sensor
57 illuminance sensor
58 chromaticity sensor
59 engine start sensor
60 hazard lamp sensor
61 camera
62 image processing unit
63 GPS receiving unit
64 map information output unit
66 headlight sensor
67 high/low sensor
100 projector
110 projection signal output unit
120 control unit
500 image projection apparatus
501 projection optical system
502 display device
503 display device driving unit
504 illumination optical system
505 light source
531 image signal input unit
533 audio signal input unit
532 communication unit

The invention claimed is:
1. An image projection apparatus that improves safety of a vehicle, the image projection apparatus comprising:
one or more sensors that acquire information related to the vehicle;
an external light sensor that detects light brightness outside the vehicle;
a projector having at least one first light source that projects an image in front of the vehicle; and a controller that is communicatively coupled to headlights of the vehicle, the one or move sensors, the external light sensor, and the projector, the headlights each having at least one second light source, wherein the controller:

controls a relative brightness of the image projected by the at least one first light source of the projector with respect to a brightness of light emitted by the at least one second light source of the headlights of the vehicle based on the light brightness detected by the external sensor, wherein the image is projected by the projector within a projection region of the headlights of the vehicle, wherein the at least one first light source of the projector and the at least one second light source of the projector are provided separately.

2. The image projection apparatus according to claim 1, wherein the one or more sensors include a vehicle speed sensor that detects vehicle speed, and the controller further controls the brightness of the image based on the vehicle speed detected.

3. The image projection apparatus according to claim 1, wherein the one or more sensors include a headlight sensor that acquires information related to the brightness of the light emitted by the at least one second light source of the headlights of the vehicle, and the controller further controls the brightness of the image based on the headlight sensor information.

4. The image projection apparatus according to claim 1, wherein the controller further controls the brightness the light emitted by the at least one second light source of the headlights based on the information acquired by the one or more sensors and the external light sensor.

5. An image projection apparatus that improves safety of a vehicle, the image projection apparatus comprising:

one or more sensors that acquire information related to the vehicle;

an external light sensor that detects light brightness outside the vehicle;

a projector having at least one first light source that projects an image in front of the vehicle; and a controller that is communicatively coupled to headlights of the vehicle, the one or more sensors, the external light sensor, and the projector, the headlights each having at least one second light source, wherein the controller:

controls the at least one second light source of the headlights of the vehicle to limit an illumination region of an illumination light of the vehicle in order that a brightness of the image projected by the at least one first light source becomes relatively high with respect to the illumination light of the vehicle based on the external light sensor, controls a shade member that blocks a part of the illumination light from the headlights, thereby separately forming a display region within a projection region of the headlights of the vehicle, and controls the projector to project the image in the display region, wherein the at least one first light source of the projector and the at least one second light source of the projector are provided separately.

6. The image projection apparatus according to claim 5, wherein the controller controls selectively forms the display region in a near region ahead of the vehicle or in a far region farther than the near region by controlling the headlights.

7. The image projection apparatus according to claim 5, wherein the projector displays the image to be projected by a black-out image on a white background.

8. The image projection apparatus according to claim 5, wherein the controller controls a shape of the shade member to form the display region.

9. The image projection apparatus according to claim 5, wherein a boundary portion between the display region of the illumination light and the projection region of the headlights is formed by overlapping both of the regions with each other.

* * * * *